US008995982B2

(12) United States Patent
Ricci

(10) Patent No.: US 8,995,982 B2
(45) Date of Patent: Mar. 31, 2015

(54) IN-CAR COMMUNICATION BETWEEN DEVICES

(71) Applicant: Flextronics AP, LLC, Milpitas, CA (US)

(72) Inventor: Christopher P. Ricci, Saratoga, CA (US)

(73) Assignee: Flextronics AP, LLC, San Jose, CA (US)

( * ) Notice: Subject to any disclaimer, the term of this patent is extended or adjusted under 35 U.S.C. 154(b) by 122 days.

(21) Appl. No.: 13/679,887

(22) Filed: Nov. 16, 2012

(65) Prior Publication Data

US 2013/0143601 A1    Jun. 6, 2013

Related U.S. Application Data

(60) Provisional application No. 61/560,509, filed on Nov. 16, 2011, provisional application No. 61/637,164, filed on Apr. 23, 2012, provisional application No. 61/646,747, filed on May 14, 2012, provisional application No. 61/653,275, filed on May 30, 2012, provisional application No. 61/653,264, filed on May 30, 2012, provisional application No. 61/653,563, filed on May 31, 2012, provisional application No. 61/663,335, filed on Jun. 22, 2012, provisional application No. 61/672,483, filed on Jul. 17, 2012, provisional application No. 61/714,016, filed on Oct. 15, 2012, provisional application No. 61/715,699, filed on Oct. 18, 2012.

(51) Int. Cl.
*H04M 3/00* (2006.01)
*G06Q 30/02* (2012.01)
*G06F 9/54* (2006.01)
(Continued)

(52) U.S. Cl.
CPC .............. *G06Q 30/0265* (2013.01); *G06F 9/54* (2013.01); *B60R 7/04* (2013.01); *G08C 19/00* (2013.01); *G06N 5/02* (2013.01); *H04L 67/02* (2013.01); *G08G 1/143* (2013.01); *H04W 84/005* (2013.01); *H04W 4/001* (2013.01); *H04W 4/046* (2013.01); *G06Q 40/08* (2013.01); *G06F 17/00* (2013.01); *G06F 17/30386* (2013.01); *G06F 3/0484* (2013.01); *G08G 1/16* (2013.01); *G06F 13/364* (2013.01); *H04N 21/482* (2013.01); *G06F 21/10* (2013.01); *G08G 1/096791* (2013.01); *G06F 13/14* (2013.01); *B60R 16/037* (2013.01); *B60W 30/182* (2013.01); *B60W 2540/28* (2013.01); *B60W 2040/0872* (2013.01);
(Continued)

(58) Field of Classification Search
CPC ........ H04W 4/02; H04W 4/046; H04W 4/021
USPC ......................................................... 455/420
See application file for complete search history.

(56) References Cited

U.S. PATENT DOCUMENTS 5,363,306 A    11/1994   Kuwahara et al.
5,508,689 A    4/1996    Rado et al.
(Continued)

OTHER PUBLICATIONS

U.S. Appl. No. 13/462,593, filed May 2, 2012, Ricci et al.
(Continued)

*Primary Examiner* — Nathan Mitchell
(74) *Attorney, Agent, or Firm* — Sheridan Ross P.C.

(57) ABSTRACT

Methods and systems for a complete vehicle ecosystem are provided. Specifically, systems that when taken alone, or together, provide an individual or group of individuals with an intuitive and comfortable vehicular environment. The present disclosure includes a system to generate a vehicle communication system. The vehicle communication system can determine which devices are within the vehicle. From this determination, the vehicle communication system may create a universal bus and hotspot where applications, data, multimedia information, and resources can be shared both with the vehicle and with the other devices in the vehicle.

20 Claims, 20 Drawing Sheets

(51) Int. Cl.

| | | |
|---|---|---|
| *B60R 7/04* | (2006.01) | |
| *G08C 19/00* | (2006.01) | |
| *G06N 5/02* | (2006.01) | |
| *H04L 29/08* | (2006.01) | |
| *G08G 1/14* | (2006.01) | |
| *H04W 84/00* | (2009.01) | |
| *H04W 4/00* | (2009.01) | |
| *H04W 4/04* | (2009.01) | |
| *G06Q 40/08* | (2012.01) | |
| *G06F 17/00* | (2006.01) | |
| *G06F 17/30* | (2006.01) | |
| *G06F 3/0484* | (2013.01) | |
| *G08G 1/16* | (2006.01) | |
| *G06F 13/364* | (2006.01) | |
| *H04N 21/482* | (2011.01) | |
| *G06F 21/10* | (2013.01) | |
| *G08G 1/0967* | (2006.01) | |
| *G06F 13/14* | (2006.01) | |
| *B60R 16/037* | (2006.01) | |
| *B60W 30/182* | (2012.01) | |
| *B60W 40/08* | (2012.01) | |
| *B60W 50/00* | (2006.01) | |

(52) U.S. Cl.
CPC ... *B60W 2050/0095* (2013.01); *B60W 2540/22* (2013.01); *B60W 2540/26* (2013.01)
USPC .......................................................... 455/420

(56) References Cited

U.S. PATENT DOCUMENTS

| | | | |
|---|---|---|---|
| 5,648,769 A | 7/1997 | Sato et al. | |
| 5,710,702 A | 1/1998 | Hayashi et al. | |
| 5,794,164 A | 8/1998 | Beckert et al. | |
| 5,838,251 A | 11/1998 | Brinkmeyer et al. | |
| 5,890,080 A | 3/1999 | Coverdill et al. | |
| 6,302,438 B1 | 10/2001 | Stopper, Jr. et al. | |
| 6,484,082 B1 | 11/2002 | Millsap et al. | |
| 6,678,747 B2 | 1/2004 | Goossen et al. | |
| 6,681,176 B2 | 1/2004 | Funk et al. | |
| 6,724,920 B1 | 4/2004 | Berenz et al. | |
| 7,019,641 B1 | 3/2006 | Lakshmanan et al. | |
| 7,295,921 B2 | 11/2007 | Spencer et al. | |
| 7,493,140 B2 * | 2/2009 | Michmerhuizen et al. | 455/552.1 |
| 7,506,375 B2 | 3/2009 | Kanda et al. | |
| 7,548,815 B2 | 6/2009 | Watkins et al. | |
| 7,549,041 B2 | 6/2009 | Wang | |
| 7,606,660 B2 | 10/2009 | Diaz et al. | |
| 7,643,913 B2 | 1/2010 | Taki et al. | |
| 7,738,462 B2 | 6/2010 | Hwang | |
| RE41,449 E | 7/2010 | Krahnstoever et al. | |
| 7,891,004 B1 | 2/2011 | Gelvin et al. | |
| 7,899,610 B2 | 3/2011 | McClellan | |
| 8,346,432 B2 | 1/2013 | Van Wiemeersch et al. | |
| 8,432,260 B2 * | 4/2013 | Talty et al. | 340/10.51 |
| 8,532,574 B2 * | 9/2013 | Kirsch | 455/41.2 |
| 8,583,292 B2 | 11/2013 | Preston et al. | |
| 8,725,311 B1 | 5/2014 | Breed | |
| 8,761,673 B2 | 6/2014 | Sakata | |
| 2002/0023010 A1 | 2/2002 | Rittmaster et al. | |
| 2002/0045484 A1 | 4/2002 | Eck et al. | |
| 2002/0105968 A1 * | 8/2002 | Pruzan et al. | 370/465 |
| 2003/0007227 A1 | 1/2003 | Ogino | |
| 2003/0158638 A1 | 8/2003 | Yakes et al. | |
| 2003/0182435 A1 | 9/2003 | Redlich et al. | |
| 2004/0024502 A1 | 2/2004 | Squires et al. | |
| 2004/0255123 A1 | 12/2004 | Noyama et al. | |
| 2005/0031100 A1 | 2/2005 | Iggulden et al. | |
| 2005/0130744 A1 | 6/2005 | Eck et al. | |
| 2005/0149752 A1 | 7/2005 | Johnson et al. | |
| 2005/0153760 A1 | 7/2005 | Varley | |
| 2006/0042846 A1 | 3/2006 | Kojori et al. | |
| 2006/0047386 A1 | 3/2006 | Kanevsky et al. | |
| 2006/0125631 A1 | 6/2006 | Sharony | |
| 2006/0250272 A1 | 11/2006 | Puamau | |
| 2006/0274829 A1 | 12/2006 | Siemens et al. | |
| 2007/0015485 A1 | 1/2007 | DeBiasio et al. | |
| 2007/0057781 A1 | 3/2007 | Breed | |
| 2007/0103328 A1 | 5/2007 | Lakshmanan et al. | |
| 2007/0120697 A1 | 5/2007 | Ayoub et al. | |
| 2007/0156317 A1 | 7/2007 | Breed | |
| 2008/0051957 A1 | 2/2008 | Breed et al. | |
| 2008/0090522 A1 * | 4/2008 | Oyama | 455/41.2 |
| 2008/0129475 A1 | 6/2008 | Breed et al. | |
| 2008/0140278 A1 | 6/2008 | Breed | |
| 2008/0148374 A1 | 6/2008 | Spaur et al. | |
| 2008/0174451 A1 | 7/2008 | Harrington et al. | |
| 2008/0212215 A1 | 9/2008 | Schofield et al. | |
| 2008/0234919 A1 | 9/2008 | Ritter et al. | |
| 2008/0253613 A1 | 10/2008 | Jones et al. | |
| 2009/0180668 A1 | 7/2009 | Jones et al. | |
| 2009/0275321 A1 | 11/2009 | Crow | |
| 2009/0278750 A1 | 11/2009 | Man et al. | |
| 2009/0278806 A1 | 11/2009 | Duarte et al. | |
| 2009/0279839 A1 | 11/2009 | Nakamura et al. | |
| 2010/0042498 A1 | 2/2010 | Schalk | |
| 2010/0090817 A1 | 4/2010 | Yamaguchi et al. | |
| 2010/0097239 A1 | 4/2010 | Campbell et al. | |
| 2010/0144284 A1 | 6/2010 | Chutorash et al. | |
| 2010/0202346 A1 | 8/2010 | Sitzes et al. | |
| 2010/0222939 A1 | 9/2010 | Namburu et al. | |
| 2010/0235042 A1 | 9/2010 | Ying | |
| 2010/0253493 A1 | 10/2010 | Szczerba et al. | |
| 2010/0295676 A1 | 11/2010 | Khachaturov et al. | |
| 2011/0035098 A1 | 2/2011 | Goto et al. | |
| 2011/0053506 A1 | 3/2011 | Lemke et al. | |
| 2011/0105097 A1 | 5/2011 | Tadayon et al. | |
| 2011/0106375 A1 | 5/2011 | Gurusamy Sundaram | |
| 2011/0112969 A1 | 5/2011 | Zaid et al. | |
| 2011/0117933 A1 | 5/2011 | Andersson | |
| 2011/0184789 A1 * | 7/2011 | Kirsch | 705/14.1 |
| 2011/0195699 A1 | 8/2011 | Tadayon et al. | |
| 2011/0267204 A1 | 11/2011 | Chuang et al. | |
| 2012/0006610 A1 * | 1/2012 | Wallace et al. | 180/272 |
| 2012/0071097 A1 | 3/2012 | Matsushita et al. | |
| 2012/0081267 A1 | 4/2012 | Sirpal et al. | |
| 2012/0081311 A1 | 4/2012 | Sirpal et al. | |
| 2012/0084542 A1 | 4/2012 | Reeves et al. | |
| 2012/0084735 A1 | 4/2012 | Sirpal | |
| 2012/0084792 A1 | 4/2012 | Benedek et al. | |
| 2012/0089299 A1 | 4/2012 | Breed | |
| 2012/0109446 A1 | 5/2012 | Yousefi et al. | |
| 2012/0110356 A1 | 5/2012 | Yousefi et al. | |
| 2012/0115446 A1 | 5/2012 | Gautama et al. | |
| 2012/0116609 A1 | 5/2012 | Jung et al. | |
| 2012/0116678 A1 | 5/2012 | Witmer | |
| 2012/0173900 A1 | 7/2012 | Diab et al. | |
| 2012/0173905 A1 | 7/2012 | Diab et al. | |
| 2012/0238286 A1 | 9/2012 | Mallavarapu et al. | |
| 2012/0242510 A1 | 9/2012 | Choi et al. | |
| 2012/0259951 A1 | 10/2012 | Schalk et al. | |
| 2012/0284292 A1 | 11/2012 | Rechsteiner et al. | |
| 2012/0296567 A1 | 11/2012 | Breed | |
| 2012/0313771 A1 | 12/2012 | Wottlifff, III | |
| 2013/0099940 A1 | 4/2013 | Protopapas | |
| 2013/0134730 A1 | 5/2013 | Ricci | |
| 2013/0135118 A1 | 5/2013 | Ricci | |
| 2013/0138591 A1 | 5/2013 | Ricci | |
| 2013/0138714 A1 | 5/2013 | Ricci | |
| 2013/0141247 A1 | 6/2013 | Ricci | |
| 2013/0141252 A1 | 6/2013 | Ricci | |
| 2013/0143495 A1 | 6/2013 | Ricci | |
| 2013/0143546 A1 | 6/2013 | Ricci | |
| 2013/0144459 A1 | 6/2013 | Ricci | |
| 2013/0144460 A1 | 6/2013 | Ricci | |
| 2013/0144461 A1 | 6/2013 | Ricci | |
| 2013/0144462 A1 | 6/2013 | Ricci | |
| 2013/0144463 A1 | 6/2013 | Ricci et al. | |
| 2013/0144469 A1 | 6/2013 | Ricci | |
| 2013/0144470 A1 | 6/2013 | Ricci | |

(56) References Cited

U.S. PATENT DOCUMENTS

| | | | |
|---|---|---|---|
| 2013/0144474 A1 | 6/2013 | Ricci | |
| 2013/0144486 A1 | 6/2013 | Ricci | |
| 2013/0144520 A1 | 6/2013 | Ricci | |
| 2013/0144657 A1 | 6/2013 | Ricci | |
| 2013/0145065 A1 | 6/2013 | Ricci | |
| 2013/0145279 A1 | 6/2013 | Ricci | |
| 2013/0145297 A1 | 6/2013 | Ricci et al. | |
| 2013/0145360 A1 | 6/2013 | Ricci | |
| 2013/0145401 A1 | 6/2013 | Ricci | |
| 2013/0145482 A1 | 6/2013 | Ricci et al. | |
| 2013/0147638 A1 | 6/2013 | Ricci | |
| 2013/0151031 A1 | 6/2013 | Ricci | |
| 2013/0151065 A1 | 6/2013 | Ricci | |
| 2013/0151088 A1 | 6/2013 | Ricci | |
| 2013/0152003 A1 | 6/2013 | Ricci et al. | |
| 2013/0154298 A1 | 6/2013 | Ricci | |
| 2013/0158821 A1 | 6/2013 | Ricci | |
| 2013/0166097 A1 | 6/2013 | Ricci | |
| 2013/0167159 A1 | 6/2013 | Ricci et al. | |
| 2013/0179689 A1 | 7/2013 | Matsumoto et al. | |
| 2013/0190978 A1* | 7/2013 | Kato et al. | 701/36 |
| 2013/0198737 A1 | 8/2013 | Ricci | |
| 2013/0198802 A1 | 8/2013 | Ricci | |
| 2013/0200991 A1 | 8/2013 | Ricci et al. | |
| 2013/0203400 A1 | 8/2013 | Ricci | |
| 2013/0204466 A1 | 8/2013 | Ricci | |
| 2013/0204484 A1 | 8/2013 | Ricci | |
| 2013/0204493 A1 | 8/2013 | Ricci et al. | |
| 2013/0204943 A1 | 8/2013 | Ricci | |
| 2013/0205026 A1 | 8/2013 | Ricci | |
| 2013/0205412 A1 | 8/2013 | Ricci | |
| 2013/0212659 A1 | 8/2013 | Maher et al. | |
| 2013/0218412 A1 | 8/2013 | Ricci | |
| 2013/0219039 A1 | 8/2013 | Ricci | |
| 2013/0227648 A1 | 8/2013 | Ricci | |
| 2013/0231800 A1 | 9/2013 | Ricci | |
| 2013/0241720 A1 | 9/2013 | Ricci et al. | |
| 2013/0245882 A1 | 9/2013 | Ricci | |
| 2013/0250933 A1 | 9/2013 | Yousefi et al. | |
| 2013/0288606 A1* | 10/2013 | Kirsch | 455/41.3 |
| 2013/0295901 A1* | 11/2013 | Abramson et al. | 455/418 |
| 2013/0309977 A1* | 11/2013 | Heines et al. | 455/67.7 |
| 2014/0032014 A1 | 1/2014 | DeBiasio et al. | |
| 2014/0066014 A1* | 3/2014 | Nicholson et al. | 455/411 |
| 2014/0088798 A1* | 3/2014 | Himmelstein | 701/2 |
| 2014/0120829 A1* | 5/2014 | Bhamidipati et al. | 455/3.06 |
| 2014/0125802 A1 | 5/2014 | Beckert et al. | |

OTHER PUBLICATIONS

U.S. Appl. No. 13/462,596, filed May 2, 2012, Ricci et al.
U.S. Appl. No. 13/829,605, filed Mar. 14, 2013, Ricci.
U.S. Appl. No. 13/830,066, filed Mar. 14, 2013, Ricci et al.
U.S. Appl. No. 13/840,240, filed Mar. 15, 2013, Ricci.
"Cadillac: 2013 XTS Full-Size Luxury Sedan," Cadillac.com, 4 pages, Jun. 2012 internet archive, found at: (web.archive.org/web/20120606185204/http://www.cadillac.com/xts-luxury-sedan.html).
Lee "Cadillac revamps the instrument panel with CUE," CNET Reviews, Oct. 11, 2011, 5 pages, found at: (reviews.cnet.com/8301-12261_7-20118807-10356022/cadillac-revamps-the-instrument-panel-with-cue/).
Marturano "General Motors Takes a CUE from Customers," InContext, Nov. 8, 2011, 3 pages, found at: (incontextdesign.com/blog/general-motors-takes-a-cue-from-customers/).
International Search Report and Written Opinion for International (PCT) Patent Application No. PCT/US12/65510, mailed May 6, 2013 17 pages.
International Search Report and Written Opinion for International (PCT) Patent Application No. PCT/US12/65613, mailed Feb. 15, 2013 9 pages.
Official Action for U.S. Appl. No. 13/679,441, mailed Sep. 5, 2013 6 pages.
Official Action for U.S. Patent Application No. 6583-315, mailed Jul. 9, 2013 10 pages.
"Time-triggered CAN," CIA, © 2001-2013, 4 pages, found at: (www.can-cia.org/index.php?id+166).
Davis et al. "Controller Area Network (CAN) schedulability analysis: Refuted, revisited and revised," Real-Time Systems, Apr. 2007, vol. 35, No. 3, pp. 239-272.
Di Natale "Controller Area Network," Dec. 2009, 54 pages.
Fonseca et al. "Scheduling for a TTCAN network with a stochastic optimization algorithm," Proceedings 8th Internatioanl CAN Conference, Jan. 2002, 7 pages.
Hartwich et al. "CAN Network with Time Triggered Communication," Robert Bosch GmbH Proceedings 7th International CAN Conference, Jul. 2000, 7 pages.
Idstein et al. "Using the Controller Area Network for Communication Between Prostesis Sensors and Control Systems," Proceedings of the 2011 MyoElectric Controls/Powered Prostetics Symposium Fredericton, New Brunswick, Canada, Aug. 14-19, 2011, 4 pages.
Official Action for U.S. Appl. No. 13/679,476, mailed Oct. 11, 2013 13 pages.
"A8: Technology as standard," Screen-shots from Audi.co.uk, 2014 [retrieved on Apr. 16, 2014], 1 page. Retrieved from: www.audi.co.uk/new-cars/a8/a8/technology-as-standard/mmi-touch.html.
"Audi A8 MMI Touch," Audi of America, Jan. 7, 2011, [retrieved on Apr. 16, 2014], 2 pages. Retrieved from: www.youtube.com/watch?v=O2nZ-WHo9IA.
Diaz, "Audi New MMI Touch Input System Makes Perfect Sense," Gizmodo.com, Dec. 1, 2009 [retrieved on Apr. 16, 2014], 12 pages. Retrieved from: http://gizmodo.com/5416342/audi-new-mmi-touch-input-system-makes-perfect-sense.
Purcher "Apple Invents In-Vehicle Holistic ID for "iOS in the Car"," Patently Apple, Dec. 2013, 8 pages [retrieved on Dec. 12, 2013 from: www.patentlyapple.com/patently-apple/2013/12/apple-invents-in-vehicle-holistic-id-for-ios-in-the-car.html].
International Preliminary Report on Patentability for International (PCT) Patent Application No. PCT/US2012/065510, mailed May 30, 2014 14 pages.
International Preliminary Report on Patentability for International (PCT) Patent Application No. PCT/US2012/065613, mailed May 30, 2014 8 pages.
International Search Report and Written Opinion for International (PCT) Patent Application No. PCT/US14/19209, mailed Apr. 25, 2014.
Official Action for U.S. Appl. No. 13/679,857, mailed Jun. 27, 2014 5 pages.
Official Action for U.S. Appl. No. 13/679,875, mailed Apr. 7, 2014 7 pages Restriction Requirement.
Official Action for U.S. Appl. No. 13/679,441, mailed Jan. 16, 2014 6 pages.
Official Action for U.S. Appl. No. 13/679,441, mailed May 9, 2014 6 pages.
Official Action for U.S. Appl. No. 13/679,476, mailed May 20, 2014 19 pages.
Official Action for U.S. Appl. No. 13/828,513, mailed May 6, 2014 7 pages.
Official Action for U.S. Appl. No. 13/829,718, mailed Apr. 10, 2014 7 pages.
Official Action for U.S. Appl. No. 13/830,003, mailed Apr. 15, 2014 9 pages.
Official Action for U.S. Appl. No. 13/678,773, mailed Dec. 30, 2013 9 pages.
Notice of Allowance for U.S. Appl. No. 13/678,773, mailed Apr. 2, 2014 5 pages.
U.S. Appl. No. 14/468,055, filed Aug. 25, 2014, Ricci.
U.S. Appl. No. 14/485,467, filed Sep. 12, 2014, Ricci.
International Search Report and Written Opinion for International (PCT) Patent Application No. PCT/US2014/019983, mailed Aug. 18, 2014 10 pages.
International Search Report and Written Opinion for International (PCT) Patent Application No. PCT/US14/19216, mailed Jul. 25, 2014 8 pages.
International Search Report and Written Opinion for International (PCT) Patent Application No. PCT/US14/19201, mailed Jul. 29, 2014 11 pages.

(56) References Cited

OTHER PUBLICATIONS

Official Action for U.S. Appl. No. 13/679,878, mailed Sep. 26, 2014 7 pages.
Official Action for U.S. Appl. No. 13/679,875, mailed Jul. 17, 2014 13 pages.
Notice of Allowance for U.S. Appl. No. 13/679,441, mailed Jul. 22, 2014 5 pages.
Official Action for U.S. Appl. No. 13/828,513, mailed Sep. 4, 2014 5 pages.
Official Action for U.S. Appl. No. 13/828,651, mailed Jul. 29, 2014 17 pages.
Notice of Allowance for U.S. Appl. No. 13/829,157, mailed Jul. 25, 2014 14 pages.
Official Action for U.S. Appl. No. 13/829,505, mailed Jul. 23, 2014 7 pages.
Official Action for U.S. Appl. No. 13/829,718, mailed Jul. 25, 2014 8 pages.
Official Action for U.S. Appl. No. 13/830,003, mailed Jul. 25, 2014 9 pages.
Official Action for U.S. Appl. No. 13/830,133, mailed Jul. 10, 2014 9 pages.
Official Action for U.S. Appl. No. 13/679,459, mailed Oct. 28, 2014, 17 pages.
Notice of Allowance for U.S. Appl. No. 13/679,857, mailed Dec. 3, 2014, 5 pages.
Official Action for U.S. Appl. No. 13/679,875, mailed Dec. 26, 2014, 14 pages.
Notice of Allowance for U.S. Appl. No. 13/679,441, mailed Oct. 29, 2014, 5 pages.
Official Action for U.S. Appl. No. 13/679,864, mailed Nov. 3, 2014, 9 pages.
Official Action for U.S. Appl. No. 13/679,476, mailed Jan. 16, 2015, 23 pages.
Official Action for U.S. Appl. No. 13/828,513, mailed Dec. 24, 2014, 7 pages.
Official Action for U.S. Appl. No. 13/828,960, mailed Jan. 5, 2015, 15 pages.
Notice of Allowance for U.S. Appl. No. 13/829,505, mailed Nov. 26, 2014, 8 pages.
Notice of Allowance for U.S. Appl. No. 13/829,718, mailed Nov. 21, 2014, 5 pages.
Notice of Allowance for U.S. Appl. No. 13/830,003, mailed Nov. 21, 2014, 7 pages.
Official Action for U.S. Appl. No. 13/830,133, mailed Oct. 29, 2014, 31 pages.
Notice of Allowance for U.S. Appl. No. 13/828,651, mailed Feb. 2, 2015, 10 pages.

* cited by examiner

Tap

Long Press

Drag

Flick

Pinch

Spread

IN-CAR COMMUNICATION BETWEEN DEVICES

CROSS REFERENCE TO RELATED APPLICATIONS

The present application claims the benefits of and priority, under 35 U.S.C. §119(e), to U.S. Provisional Application Ser. Nos. 61/560,509, filed on Nov. 16, 2011, entitled "Complete Vehicle Ecosystem;" 61/637,164, filed on Apr. 23, 2012, entitled "Complete Vehicle Ecosystem;" 61/646,747, filed on May 14, 2012, entitled "Branding of Electrically Propelled Vehicles Via the Generation of Specific Operating Sounds;" 61/653,275, filed on May 30, 2012, entitled "Vehicle Application Store for Console;" 61/653,264, filed on May 30, 2012, entitled "Control of Device Features Based on Vehicle State;" 61/653,563, filed on May 31, 2012, entitled "Complete Vehicle Ecosystem;" 61/663,335, filed on Jun. 22, 2012, entitled "Complete Vehicle Ecosystem;" 61/672,483, filed on Jul. 17, 2012, entitled "Vehicle Climate Control;" 61/714,016, filed on Oct. 15, 2012, entitled "Vehicle Middleware;" and 61/715,699, filed Oct. 18, 2012, entitled "Vehicle Middleware." The entire disclosures of the applications listed above are hereby incorporated by reference, in their entirety, for all that they teach and for all purposes.

This application is also related to U.S. patent application Ser. No. 13/420,236, filed on Mar. 14, 2012, entitled, "Configurable Vehicle Console;" Ser. No. 13/420,240, filed on Mar. 14, 2012, entitled "Removable, Configurable Vehicle Console;" Ser. No. 13/462,593, filed on May 2, 2012, entitled "Configurable Dash Display;" Ser. No. 13/462,596, filed on May 2, 2012, entitled "Configurable Heads-Up Dash Display;" Ser. No. 13/679,459, filed on Nov. 16, 2012, entitled "Vehicle Comprising Multi-Operating System"; Ser. No. 13/679,234, filed on Nov. 16, 2012, entitled "Gesture Recognition for On-Board Display"; Ser. No. 13/679,412, filed on Nov. 16, 2012, entitled "Vehicle Application Store for Console"; Ser. No. 13/679,857, filed on Nov. 16, 2012, entitled "Sharing Applications/Media Between Car and Phone (Hydroid)"; Ser. No.13/679,878, filed on Nov. 16, 2012, entitled "In-Cloud Connection for Car Multimedia"; Ser. No.13/679,875, filed on Nov. 16, 2012, entitled "Music Streaming"; Ser. No.13/679,676, filed on Nov. 16, 2012, entitled "Control of Device Features Based on Vehicle State"; Ser. No. 13/678,673, filed on Nov. 16, 2012, entitled "Insurance Tracking"; Ser. No. 13/678,691, filed on Nov. 16, 2012, entitled "Law Breaking/Behavior Sensor"; Ser. No. 13/678,699, filed on Nov. 16, 2012, entitled "Etiquette Suggestion"; Ser. No. 13/678,710, filed on Nov. 16, 2012, entitled "Parking Space Finder Based on Parking Meter Data"; Ser. No. 13/678,722, filed on Nov. 16, 2012, entitled "Parking Meter Expired Alert"; Ser. No. 13/678,726, filed on Nov. 16, 2012, entitled "Object Sensing (Pedestrian Avoidance/Accident Avoidance)"; Ser. No. 13/678,735, filed on Nov. 16, 2012, entitled "Proximity Warning Relative to Other Cars"; Ser. No. 13/678,745, filed on Nov. 16, 2012, entitled "Street Side Sensors"; Ser. No. 13/678,753, filed on Nov. 16, 2012, entitled "Car Location"; Ser. No. 13/679,441, filed on Nov. 16, 2012, entitled "Universal Bus in the Car"; Ser. No. 13/679,864, filed on Nov. 16, 2012, entitled "Mobile Hot Spot/Router/Application Share Site or Network"; Ser. No. 13/679,815, filed on Nov. 16, 2012, entitled "Universal Console Chassis for the Car"; Ser. No. 13/679,476, filed on Nov. 16, 2012, entitled "Vehicle Middleware"; Ser. No. 13/679,306, filed on Nov. 16, 2012, entitled "Method and System for Vehicle Data Collection Regarding Traffic"; Ser. No.13/679,369, filed on Nov. 16, 2012, entitled "Method and System for Vehicle Data Collection"; Ser. No. 13/679,680, filed on Nov. 16, 2012, entitled "Communications Based on Vehicle Diagnostics and Indications"; Ser. No. 13/679,443, filed on Nov. 16, 2012, entitled "Method and System for Maintaining and Reporting Vehicle Occupant Information"; Ser. No. 13/678,762, filed on Nov. 16, 2012, entitled "Behavioral Tracking and Vehicle Applications"; Ser. No. 13/840,240 filed on Mar. 15, 2013, entitled "Improvements to Controller Area Network Bus"; Ser. No. 13/678,773, filed on Nov. 16, 2012, entitled "Location Information Exchange Between Vehicle and Device"; Ser. No. 13/679,842, filed on Nov. 16, 2012, entitled "Configurable Hardware Unit for Car Systems"; Ser. No. 13/679,204, filed on Nov. 16, 2012, entitled "Feature Recognition for Configuring a Vehicle Console and Associated Devices"; Ser. No. 13/679,350, filed on Nov. 16, 2012, entitled "Configurable Vehicle Console"; Ser. No. 13/679,358, filed on Nov. 16, 2012, entitled "Configurable Dash Display"; Ser. No. 13/679,363, filed on Nov. 16, 2012, entitled "Configurable Heads-Up Dash Display"; and Ser. No. 13/679,368, filed on Nov. 16, 2012, entitled "Removable, Configurable Vehicle Console". The entire disclosures of the applications listed above are hereby incorporated by reference, in their entirety, for all that they teach and for all purposes.

BACKGROUND

Whether using private, commercial, or public transport, the movement of people and/or cargo has become a major industry. In today's interconnected world daily travel is essential to engaging in commerce. Commuting to and from work can account for a large portion of a traveler's day. As a result, vehicle manufacturers have begun to focus on making this commute, and other journeys, more enjoyable and easier.

Currently, vehicle manufacturers attempt to entice travelers to use a specific conveyance based on any number of features. Most of these features focus on vehicle safety or efficiency. From the addition of safety-restraints, air-bags, and warning systems to more efficient engines, motors, and designs, the vehicle industry has worked to appease the supposed needs of the traveler. Recently, however, vehicle manufactures have shifted their focus to user and passenger comfort as a primary concern. Making an individual more comfortable while traveling instills confidence and pleasure in using a given vehicle and increases an individual's preference for a given manufacturer and/or vehicle type.

One way to instill comfort in a vehicle is to create an environment within the vehicle similar to that of an individual's home. Integrating features in a vehicle that are associated with comfort found in an individual's home can ease a traveler's transition from home to vehicle. Several manufacturers have added comfort features in vehicles such as the following: leather seats, adaptive and/or personal climate control systems, music and media players, ergonomic controls, Internet connectivity, etc. However, because these manufacturers have added features to a conveyance, they have built comfort around a vehicle and failed to build a vehicle around comfort. Thus, the vehicle as an ecosystem has not been fully considered.

SUMMARY

There is a need for a vehicle ecosystem that can integrate both physical and mental comforts while seamlessly operating with current electronic devices to result in a totally intuitive and immersive user experience. These and other needs are addressed by the various aspects, embodiments, and/or configurations of the present disclosure. Also, while the disclosure is presented in terms of exemplary embodiments, it should be appreciated that individual aspects of the disclosure can be separately claimed.

The present disclosure can provide a number of advantages depending on the particular aspect, embodiment, and/or configuration. Currently, the vehicle industry is dominated by conveyances offering a separate comfort experience from a home, work, or other aspect of a traveler's life. Unfortunately, current vehicles include a series of separate devices that work together while an individual or individuals are associated with the vehicle. Technology areas and devices such as user interfaces, applications, tracking capabilities, hardware, and/or location-based communications, could be combined together, or used separately, to form a complete vehicle ecosystem. This ecosystem can provide a connected and intuitive user experience for any traveler.

A series of devices associated with a vehicle along with other devices can form a complete and familiar user experience. In particular, the devices, applications, interfaces, hardware, and software may combine to form a user-friendly environment while traveling or otherwise moving from one location to another and/or when a vehicle is at rest. Moreover, aspects of the present disclosure may provide communication between the vehicle and a user at any given time. Specifically, communication between a vehicle and another device may also relay information to an individual and/or group of individuals. This communication between a vehicle and at least one other device may include, but is not limited to, communication between a vehicle and: 1) at least one mobile device, 2) at least one other vehicle, 3) another system/group of devices, 4) a non-mobile device, and 5) combinations thereof. These and other advantages will be apparent from the disclosure.

Methods and systems for a complete vehicle ecosystem are provided. Specifically, systems that when taken alone, or together, provide an individual or group of individuals with an intuitive and comfortable vehicular environment. The present disclosure includes a system to generate a vehicle communication system. The vehicle communication system can determine which devices are within the vehicle. From this determination, the vehicle communication system may create a universal bus and hotspot where applications, data, multimedia information, and resources can be shared both with the vehicle and with the other devices in the vehicle.

The term "ecosystem" or "vehicle ecosystem," as used herein, refers to a community of person(s) in conjunction with the vehicle or other device components of their environment (for example, climate control, safety features, mobile devices, multimedia sources etc.), interacting as a system.

The term "environment" or "vehicle environment," as used herein, refers to the surroundings or conditions in which a person operates a vehicle.

The term "sensor," as used herein, refers to a converter or instrument that measures a physical quantity or quality and converts the measurement into a signal which can be read, observed, stored, and/or understood by an observer or by another instrument.

The term "stimulus," as used herein, refers to some event or something external that influences an activity.

The term "automotive navigation system" is a satellite navigation system designed for use in automobiles. It typically uses a GPS navigation device to acquire position data to locate the user on a road in the unit's map database. Using the road database, the unit can give directions to other locations along roads also in its database. Dead reckoning using distance data from sensors attached to the drivetrain, a gyroscope and an accelerometer can be used for greater reliability, as GPS signal loss and/or multipath can occur due to urban canyons or tunnels.

The term "bus" and variations thereof, as used herein, refers to a subsystem that transfers information and/or data between various components. A bus generally refers to the collection communication hardware interface, interconnects, bus architecture, and/or protocol defining the communication scheme for a communication system and/or communication network. A bus may also be specifically refer to a part of a communication hardware that interfaces the communication hardware with the interconnects that connect to other components of the corresponding communication network. The bus may be for a wired network, such as a physical bus, or wireless network, such as part of an antenna or hardware that couples the communication hardware with the antenna. A bus architecture supports a defined format in which information and/or data is arranged when sent and received through a communication network. A protocol may define the format and rules of communication of a bus architecture.

The terms "communication device," "smartphone," and "mobile device," and variations thereof, as used herein, are used interchangeably and include any type of device capable of communicating with one or more of another device and/or across a communications network, via a communications protocol, and the like. Exemplary communication devices may include but are not limited to smartphones, handheld computers, laptops, netbooks, notebook computers, subnotebooks, tablet computers, scanners, portable gaming devices, phones, pagers, GPS modules, portable music players, and other Internet-enabled and/or network-connected devices.

The terms "head unit," "dash," "dashboard," and variations thereof, as used herein, are used interchangeably and include any panel and/or area of a vehicle disposed adjacent to an operator, user, and/or passenger. Typical dashboards may include but are not limited to one or more control panel, instrument housing, head unit, indicator, gauge, meter, light, audio equipment, computer, screen, display, HUD unit, and graphical user interface.

The term "electronic address" refers to any contactable address, including a telephone number, instant message handle, e-mail address, Universal Resource Locator ("URL"), Universal Resource Identifier ("URI"), Address of Record ("AOR"), electronic alias in a database, like addresses, and combinations thereof.

The term "communication system" or "communication network" and variations thereof, as used herein, refers to a collection of communication components capable of one or more of transmission, relay, interconnect, control, or otherwise manipulate information or data from at least one transmitter to at least one receiver. As such, the communication may include a range of systems supporting point-to-point to broadcasting of the information or data. A communication system may refer to the collection individual communication hardware as well as the interconnects associated with and connecting the individual communication hardware. Communication hardware may refer to dedicated communication hardware or may refer a processor coupled with a communication means (i.e. an antenna) and running software capable of using the communication means to send a signal within the communication system. Interconnect refers some type of wired or wireless communication link that connects various components, such as communication hardware, within a communication system. A communication network may refer to a specific setup of a communication system with the collection of individual communication hardware and interconnects having some definable network topography. A communication network may include wired and/or wireless network having a pre-set to an ad hoc network structure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity," as used herein, refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium," as used herein, refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "desktop," as used herein, refers to a metaphor used to portray systems. A desktop is generally considered a "surface" that typically includes pictures, called icons, widgets, folders, etc. that can activate show applications, windows, cabinets, files, folders, documents, and other graphical items. The icons are generally selectable to initiate a task through user interface interaction to allow a user to execute applications or conduct other operations.

The term "display," as used herein, refers to a portion of a screen used to display the output of a computer to a user.

The term "displayed image," as used herein, refers to an image produced on the display. A typical displayed image is a window or desktop. The displayed image may occupy all or a portion of the display.

The term "display orientation," as used herein, refers to the way in which a rectangular display is oriented by a user for viewing. The two most common types of display orientation are portrait and landscape. In landscape mode, the display is oriented such that the width of the display is greater than the height of the display (such as a 4:3 ratio, which is 4 units wide and 3 units tall, or a 16:9 ratio, which is 16 units wide and 9 units tall). Stated differently, the longer dimension of the display is oriented substantially horizontal in landscape mode while the shorter dimension of the display is oriented substantially vertical. In the portrait mode, by contrast, the display is oriented such that the width of the display is less than the height of the display. Stated differently, the shorter dimension of the display is oriented substantially horizontal in the portrait mode while the longer dimension of the display is oriented substantially vertical. The multi-screen display can have one composite display that encompasses all the screens. The composite display can have different display characteristics based on the various orientations of the device.

The term "gesture," as used herein, refers to a user action that expresses an intended idea, action, meaning, result, and/or outcome. The user action can include manipulating a device (e.g., opening or closing a device, changing a device orientation, moving a trackball or wheel, etc.), movement of a body part in relation to the device, movement of an implement or tool in relation to the device, audio inputs, etc. A gesture may be made on a device (such as on the screen) or with the device to interact with the device.

The term "module," as used herein, refers to any known or later developed hardware, software, firmware, artificial intelligence, fuzzy logic, or combination of hardware and software that is capable of performing the functionality associated with that element.

The term "gesture recognition" or "gesture capture," as used herein, refers to a sense or otherwise a detection of an instance and/or type of user gesture. The gesture capture can occur in one or more areas of the screen, A gesture region can be on the display, where it may be referred to as a touch sensitive display or off the display where it may be referred to as a gesture capture area.

A "multi-screen application," as used herein, refers to an application that is capable of producing one or more windows that may simultaneously occupy multiple screens. A multi-screen application commonly can operate in single-screen mode in which one or more windows of the application are displayed only on one screen or in multi-screen mode in which one or more windows are displayed simultaneously on multiple screens.

A "single-screen application," as used herein, refers to an application that is capable of producing one or more windows that may occupy only a single screen at a time.

The term "screen," "touch screen," or "touchscreen," as used herein, refers to a physical structure that enables the user to interact with the computer by touching areas on the screen and provides information to a user through a display. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates.

The term "window" refers to a, typically rectangular, displayed image on at least part of a display that contains or provides content different from the rest of the screen. The window may obscure the desktop.

The terms "determine", "calculate" and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "vehicle" as used herein includes any conveyance, or model of a conveyance, where the conveyance was originally designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Presented herein are embodiments of a complete vehicle ecosystem. The ecosystem can comprise single devices or a compilation of devices. This device, or these devices, may be capable of communicating with other devices and/or to an individual or group of individuals. Further, this device, or these devices, can receive user input in unique ways. The overall design and functionality of each device provides for an enhanced user experience making the device more useful and more efficient. As described herein, the device(s) may be electrical, mechanical, electro-mechanical, software-based, and/or combinations thereof.

Figure 1:
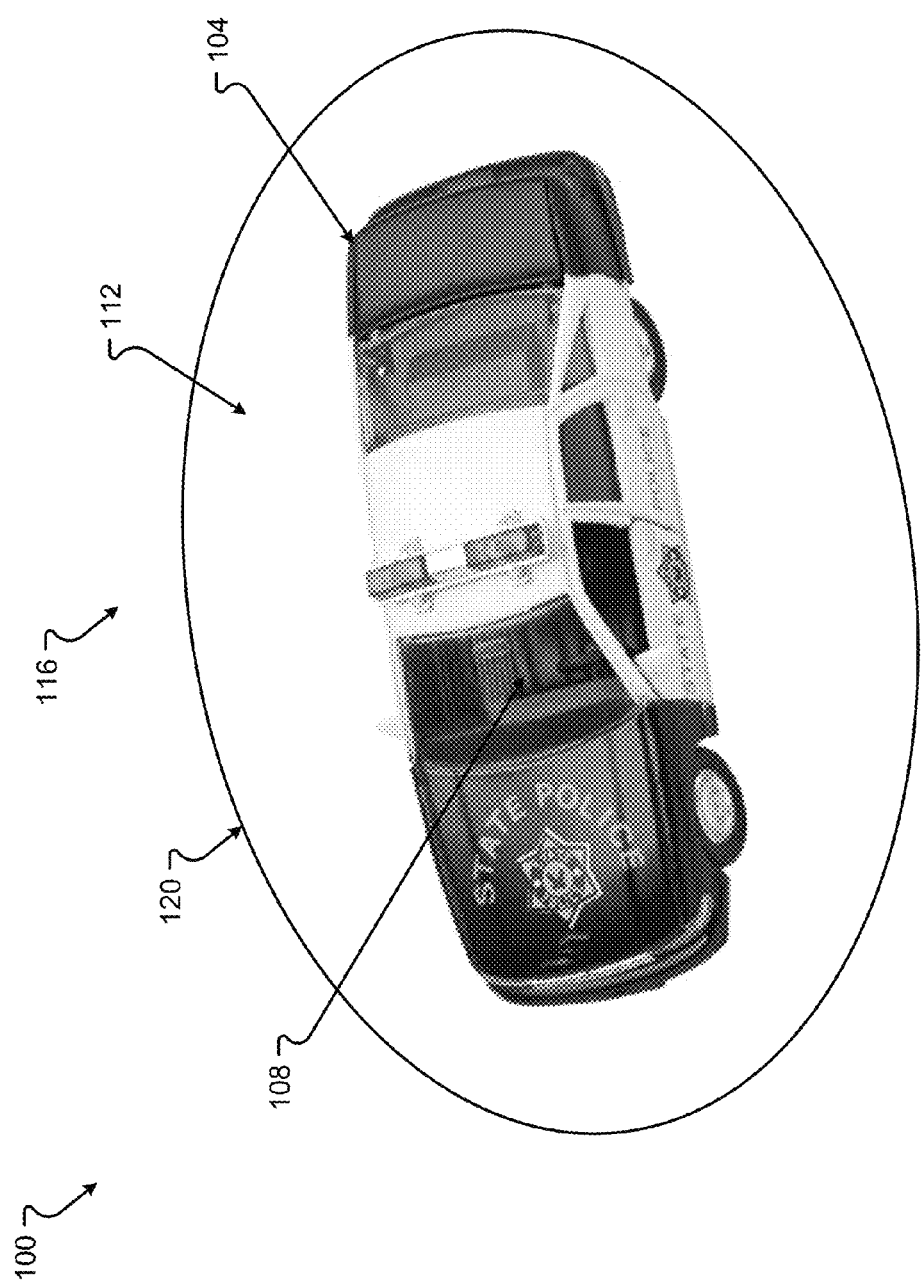
FIG. 1 depicts an embodiment of a vehicle operating environment.

A vehicle environment 100 that may contain a vehicle ecosystem is shown in FIG. 1. The vehicle environment 100 can contain areas associated with a vehicle or conveyance 104. The vehicle 104 is shown as a police car but can be any type of conveyance. The environment 100 can include at least three zones. A first zone 108 may be inside a vehicle 104. The zone 108 includes any interior space, trunk space, engine compartment, or other associated space within or associated with the vehicle 104. The interior environment 108 can be defined by one or more techniques, for example, geo-fencing.

A second zone 112 may be delineated by line 120. The zone 112 is created by a range of one or more sensors associated with the vehicle 104. Thus, the area 112 is exemplary of the range of those sensors and what can be detected by those sensors associated with the vehicle 104. The rest of the environment includes all space beyond the range of the sensors and is represented by 116. Thus, the environment 100 may have an area 116 that includes all areas beyond the sensor range 112. The area 116 may include future locations of travel that the vehicle 104 may proceed to in the future.

Figure 2:
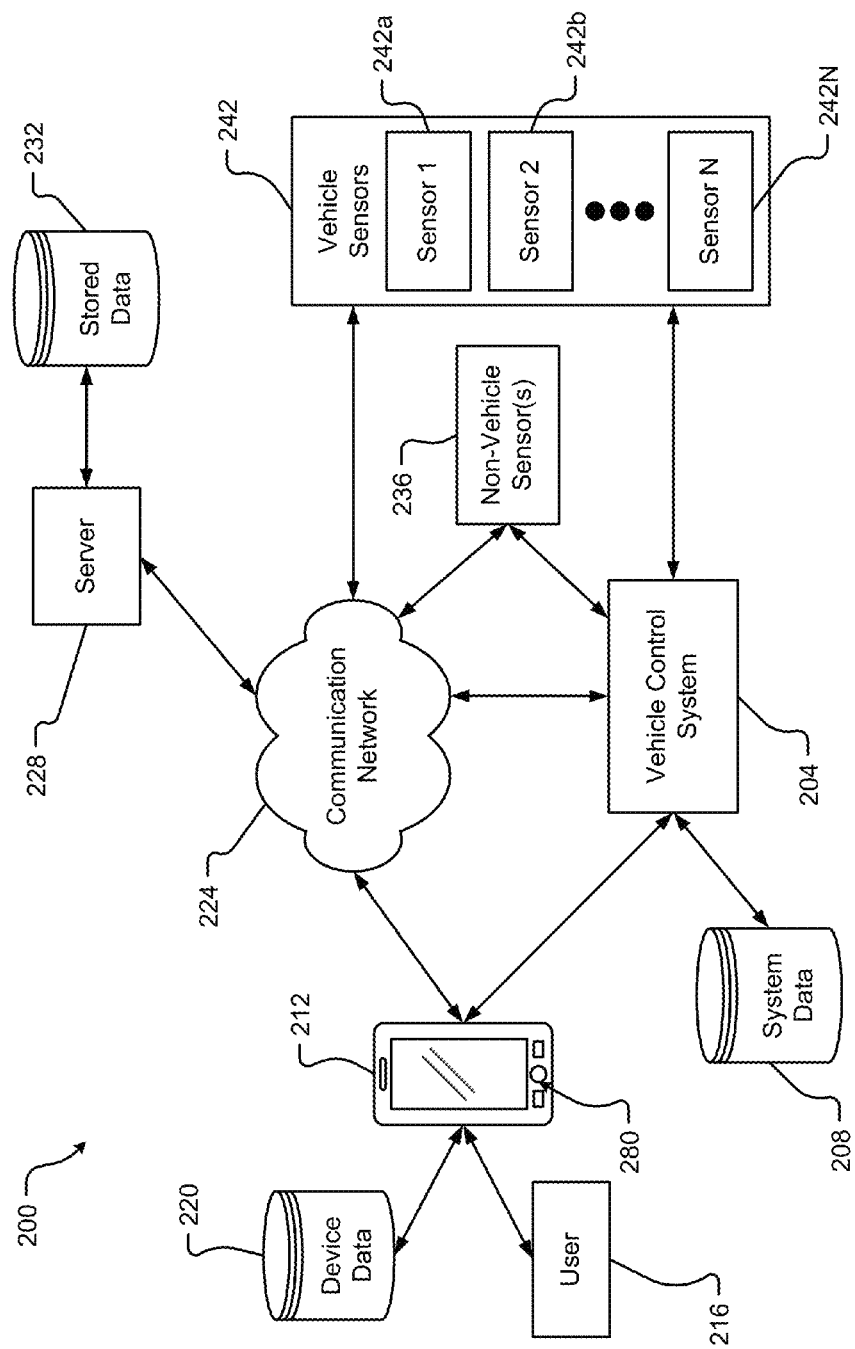
FIG. 2 is a block diagram of an embodiment of a vehicle system.

An embodiment of a vehicle system 200 is shown in FIG. 2. The vehicle system 200 may consist of hardware and/or software that conduct various operations for or with the vehicle 104. The operations can include, but are not limited to providing information to the user, receiving input from the user, and controlling the functions or operation of the vehicle 104, etc. The vehicle system 200 can include a vehicle control system 204. The vehicle control system 204 can be any type of computing system operable to conduct the operations as described herein.

The vehicle control system 204 may interact with a memory or storage system 208 that stores system data. System data 208 may be any type of data needed for the vehicle control system 204 to control effectively the vehicle 104. An example of some of the data that may be stored by the vehicle control system 204 may be as described in conjunction with FIG. 8. The system data 208 can represent any type of database or other storage system. Thus, the system data 208 can be a flat file data system, an object-oriented data system, or some other data system that may interface with the vehicle control system 204.

The vehicle control system 204 may communicate with a device or user interface 212. The user interface 212 may be as described in conjunction with FIG. 5. The user interface 212 may be operable to receive user input either through touch input, on one or more user interface buttons, or through a graphical user interface that may include a gesture capture region, as described in conjunction with FIG. 5. Further, the symbol 212 can represent a device that is located or associated with the vehicle 104. The device 212 can be a mobile device, including, but not limited to, a mobile telephone, a mobile computer, or other type of computing system or device that is either permanently located in or temporarily associated with the automobile 104. Thus, the vehicle control system 204 can interface with the device 212 and leverage the devices computing capability to provide one or more of the features or functions as described herein.

The device or user interface 212 can receive input or provide information to a user 216. The user 216 may thus interact with the vehicle control system 204 through the interface or device 212. Further, the device 212 may include or have access to device data 220. The device data 220 can be any type of data that is used in conjunction with the device 212, including, but not limited to, multimedia data, preferences data, bioinformatics, data associated with the user 216, or other types of data. The data may be stored in a device data 220 as a storage system similar to that described in conjunction with system data 208.

The vehicle control system 204 may also communicate with or through a communication network 224. The communication network 224 can represent any type of wireless or wired communication system that may be included within the vehicle 104 or operable to communicate outside the vehicle 104. Thus, the communication network 224 can include a local area communication capability and a wide area communication capability. For example, the communication network 224 can include a BLUETOOTH™ wireless system, an 802.11G or 802.11N wireless system, a CAN bus, an Ethernet network within the vehicle 104, or other types of communication networks that may function with or be associated with the vehicle 104. Further, the communication network 224 can also include wide area communication capabilities, including one or more of, but not limited to, a cellular communication capability, satellite telephone communication capability, a wireless wide area network communication capability, or other types of communication capabilities that allow for the vehicle control system 204 to communicate outside the vehicle 104.

The vehicle control system 204 may communicate through the communication network 224 to a server 228 that may be located in a facility that is not within physical proximity to the vehicle 104. Thus, the server 224 may represent a cloud computing system or cloud storage that allows the vehicle control system 204 to either gain access to further computing capabilities or to storage in a location outside of the vehicle 104. The server 228 can include a computer processor and memory and be similar to any computing system as understood to one skilled in the art.

Further, the server 228 may be associated with stored data 232. The stored data 232 may be stored in any system or by any method, as described in conjunction with system data 208 and/or device data 220. The stored data 232 can include information that may be associated with one or more users 216 or associated with one or more vehicles 104. The stored data 232, being stored in a cloud or in a distant facility, may be exchanged among vehicles 104 or may be used by a user 216 in different locations or with different vehicles 104.

The vehicle control system 204 may also communicate with one or more sensors 236/242, which are either associated with the vehicle 104 or communicate with the vehicle 104. Vehicle sensors 242 may include one or more sensors for providing information to the vehicle control system 204 that determine or provide information about the environment 100 in which the vehicle 104 is operating. Embodiments of these sensors may be as described in conjunction with FIG. 4. Non-vehicle sensor 236 can be any type of sensor that isn't currently associated with the vehicle 104. For example, non-vehicle sensor 236 can be sensors in a traffic system operated by a third party that provides data to the vehicle control system 204. Further, the non-vehicle sensor 236 can be other types of sensors which provide information about the distant environment 116 or other information about the vehicle 104 or the environment 100. These non-vehicle sensors 236 may be operated by third parties but provide information to the vehicle control system 204. Examples of information that may be used by the vehicle control system 204 may include weather tracking data, user health tracking data, vehicle maintenance data, or other types of data, which may provide environmental or other data to the vehicle control system 204.

Figure 3:
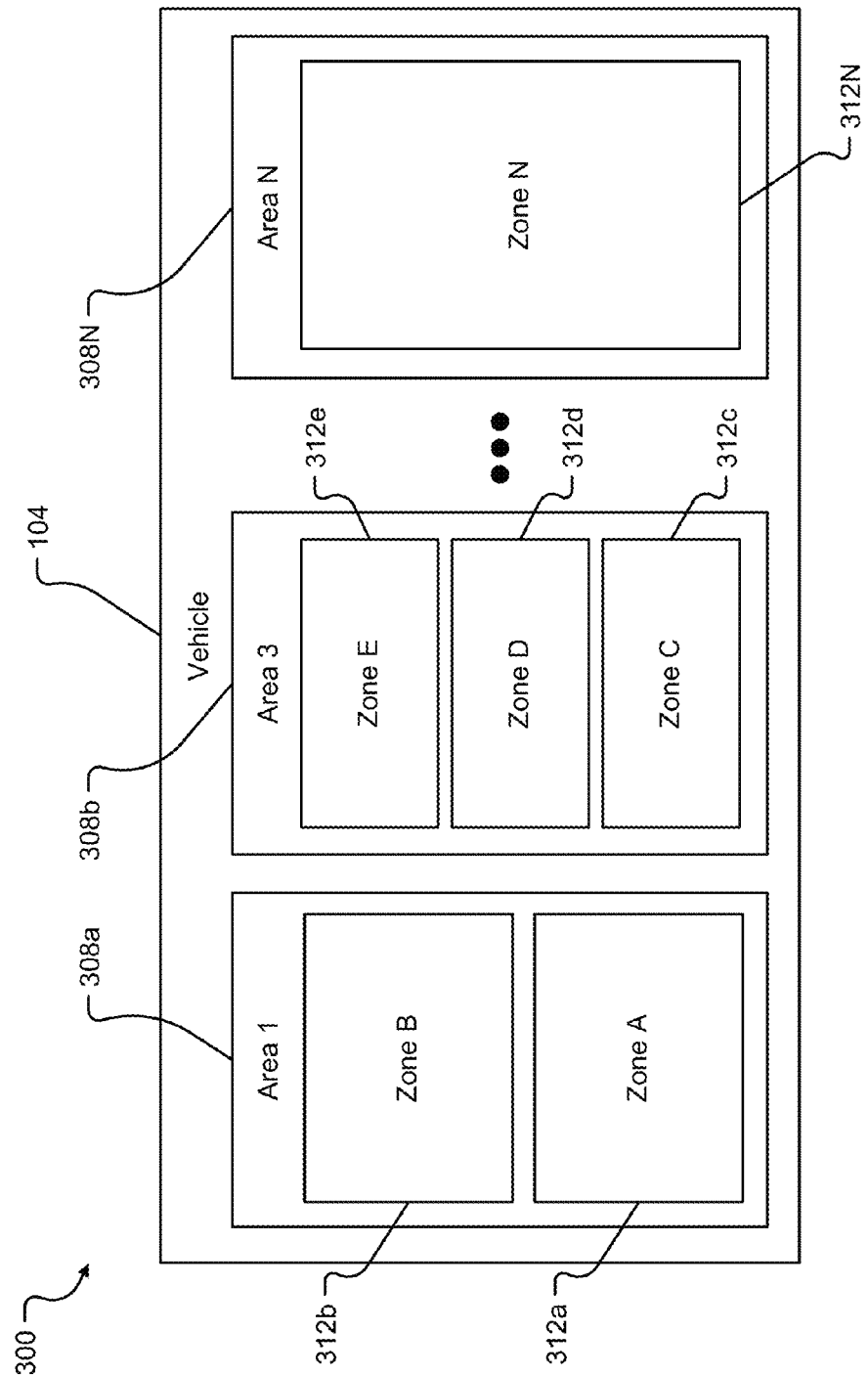
FIG. 3 is a block diagram of an embodiment of a vehicle interior environment separated into areas and/or zones.

An arrangement or configuration for sensors within a vehicle 104 is as shown in FIG. 3. The sensor arrangement 300 can include one or more areas 308 within the vehicle. An area can be a larger part of the environment inside or outside of the vehicle 104. Thus, area one 308A may include the area within the trunk space or engine space of the vehicle 104 and/or the front passenger compartment. Area three 308B may include a portion of the interior space 108 of the vehicle 104. The area N, 308N may include the trunk space or rear compartment area, when included within the vehicle 104. The interior space 108 may also be divided into areas. Thus, one area may be associated with the front passenger's and driver's seats, a second area may be associated with the middle passengers' seats, and a third area may be associated with a rear passenger's seat. Each area 308 may include one or more sensors that are positioned or operate to provide environmental information about that area 308.

Each area 308 may be further separated into one or more zones 312 within the area 308. For example, area 1 308A may be separated into zone A, 312*a*, and zone B, 312*a*. Each zone 312 may be associated with a particular portion of the interior occupied by a passenger. For example, zone A, 312*a* may be associated with a driver. Zone B, 312*b*, may be associated with a front passenger. Each zone 312 may include one or more sensors that are positioned or configured to collect information about the environment or ecosystem associated with that zone or person.

A passenger area 308*b* may include more than two zones as described in conjunction with area 308*a*. For example, area 308*b* may include three zones, 312*c*, 312*d*, and 312*e*. These three separate zones 312*c*, 312*d*, and 312*e* may be associated with three passenger seats typically found in the rear passenger area of an automobile 104. An area 308N and may include a single zone 312N as there may be no separate passenger areas but may include be a single trunk area within the vehicle 104. The number of zones 312 is unlimited within the areas as the areas are also unlimited inside the vehicle 104. Further, it should be noted that there may be one or areas 308 or zones 312 that may be located outside the vehicle 104 that may have a specific set of sensors associated therewith.

Figure 4:
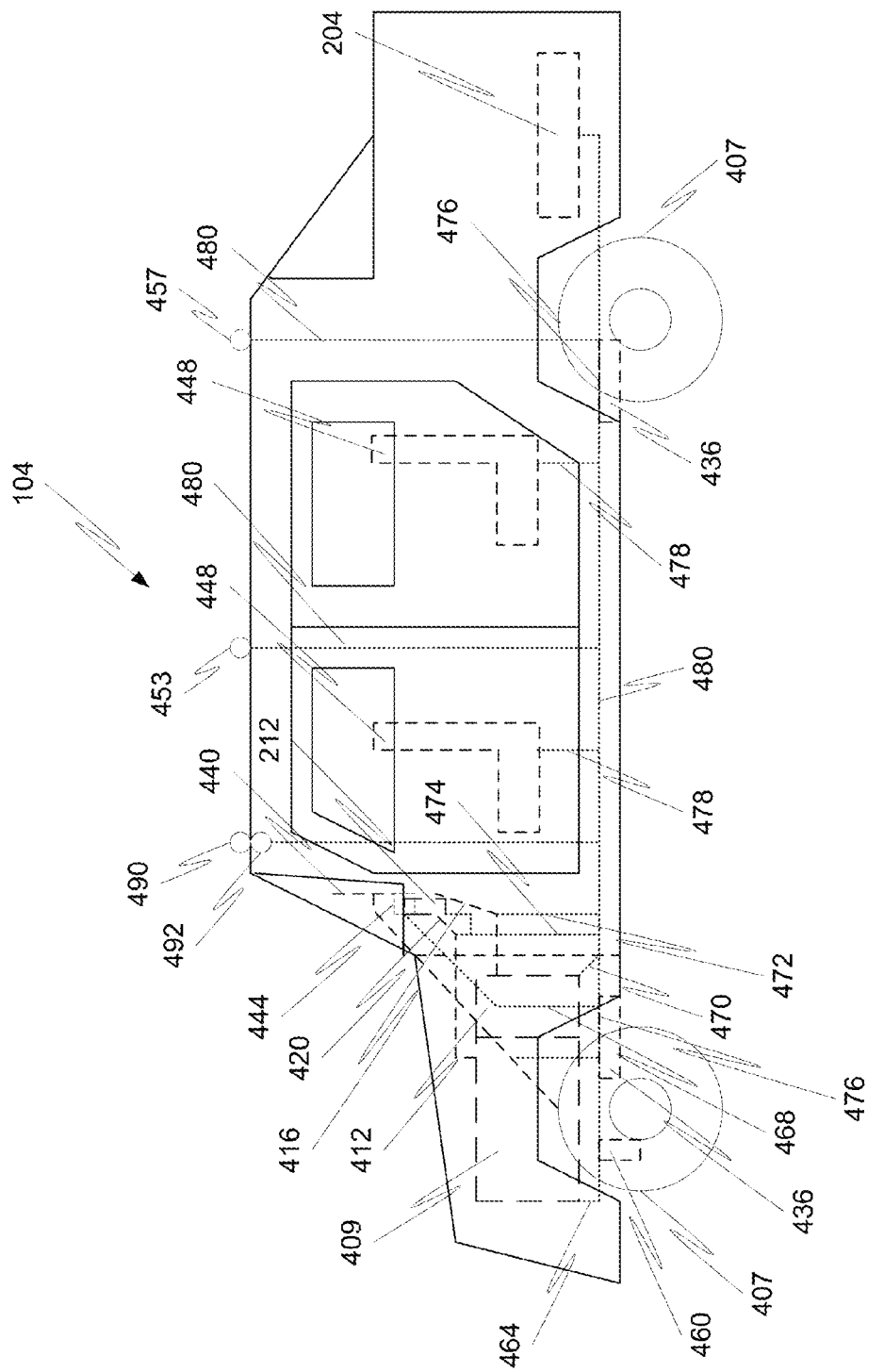
FIG. 4 depicts an embodiment of a sensor configuration for a vehicle.

A set of sensors or vehicle components 400 associated with the vehicle 404 may be as shown in FIG. 4. The vehicle 104 includes, among many other components common to vehicles, wheels 407, a power source 409 (such as an engine, motor, or energy storage system (e.g., battery or capacitive energy storage system)), a manual or automatic transmission 412, a manual or automatic transmission gear controller 416, a power controller 420 (such as a throttle), a vehicle control system 204, the display device 212, a braking system 436, a steering wheel 440, a power source activation/deactivation switch 444 (e.g., an ignition), an occupant seating system 448, a wireless signal receiver 453 to receive wireless signals from signal sources such as roadside beacons and other electronic roadside devices, and a satellite positioning system receiver 457 (e.g., a Global Positioning System ("GPS") (US), GLONASS (Russia), Galileo positioning system (EU), Compass navigation system (China), and Regional Navigational Satellite System (India) receiver).

The vehicle 104 includes a number of sensors in wireless or wired communication with the vehicle control system 204 and/or display device 212 to collect sensed information regarding the vehicle state, configuration, and/or operation. Exemplary sensors include wheel state sensor 460 to sense one or more of vehicle speed, acceleration, deceleration, wheel rotation, wheel speed (e.g., wheel revolutions-per-minute), wheel slip, and the like, a power source energy output sensor 464 to sense a power output of the power source 409 by measuring one or more of current engine speed (e.g., revolutions-per-minute), energy input and/or output (e.g., voltage, current, fuel consumption, and torque) (e.g., turbine speed sensor, input speed sensor, crankshaft position sensor, manifold absolute pressure sensor, mass flow sensor, and the like), and the like, a switch state sensor 468 to determine a current activation or deactivation state of the power source activation/deactivation switch 444, a transmission setting sensor 470 to determine a current setting of the transmission (e.g., gear selection or setting), a gear controller sensor 472 to determine a current setting of the gear controller 416, a power controller sensor 474 to determine a current setting of the power controller 420, a brake sensor 476 to determine a current state (braking or non-braking) of the braking system 436, a seating system sensor 478 to determine a seat setting and current weight of seated occupant, if any) in a selected seat of the seating system 448, exterior and interior sound receivers 490 and 492 (e.g., a microphone and other type of acoustic-to-electric transducer or sensor) to receive and convert sound waves into an equivalent analog or digital signal. Examples of other sensors (not shown) that may be employed include safety system state sensors to determine a current state of a vehicular safety system (e.g., air bag setting (deployed or undeployed) and/or seat belt setting (engaged or not engaged)), light setting sensor (e.g., current headlight, emergency light, brake light, parking light, fog light, interior or passenger compartment light, and/or tail light state (on or off)), brake control (e.g., pedal) setting sensor, accelerator pedal setting or angle sensor, clutch pedal setting sensor, emergency brake pedal setting sensor, door setting (e.g., open, closed, locked or unlocked) sensor, engine temperature sensor, passenger compartment or cabin temperature sensor, window setting (open or closed) sensor, one or more cameras or other imaging sensors (which commonly convert an optical image into an electronic signal but may include other devices for detection objects such as an electromagnetic radiation emitter/receiver that emits electromagnetic radiation and receives electromagnetic waves reflected by the object) to sense objects, such as other vehicles and pedestrians and optionally determine the distance, trajectory and speed of such objects, in the vicinity or path of the vehicle, odometer reading sensor, trip mileage reading sensor, wind speed sensor, radar transmitter/receiver output, brake wear sensor, steering/torque sensor, oxygen sensor, ambient lighting sensor, vision system sensor, ranging sensor, parking sensor, heating, venting, and air conditioning (HVAC) sensor, water sensor, air-fuel ratio meter, blind spot monitor, hall effect sensor, microphone, radio frequency (RF) sensor, infrared (IR) sensor, vehicle control system sensors, wireless network sensor (e.g., Wi-Fi and/or BLUETOOTH™ sensor), cellular data sensor, and other sensors known to those of skill in the vehicle art.

In the depicted vehicle embodiment, the various sensors are in communication with the display device 212 and vehicle control system 204 via signal carrier network 480. As noted, the signal carrier network 480 can be a network of signal conductors, a wireless network (e.g., a radio frequency, microwave, or infrared communication system using a communications protocol, such as Wi-Fi), or a combination thereof.

In one implementation, the control system 424 receives and reads sensor signals, such as wheel and engine speed signals, as a digital input comprising, for example, a pulse width modulated (PWM) signal. The processor 304 can be configured, for example, to read each of the signals into a port configured as a counter or configured to generate an interrupt on receipt of a pulse, such that the processor 304 can determine, for example, the engine speed in revolutions per minute (RPM) and the speed of the vehicle in miles per hour (MPH). One skilled in the art will recognize that the two signals can be received from existing sensors in a vehicle comprising a tachometer and a speedometer, respectively. Alternatively, the current engine speed and vehicle speed can be received in a communication packet as numeric values from a conventional dashboard subsystem comprising a tachometer and a speedometer. The transmission speed sensor signal can be similarly received as a digital input comprising a signal coupled to a counter or interrupt signal of the processor 304, or received as a value in a communication packet on the network or port interface 352 from an existing subsystem of the vehicle. The ignition sensor signal can be configured as a digital input, wherein a HIGH value represents that the ignition is on and a LOW value represents that the ignition is OFF. Three bits of the port interface 352 can be configured as a digital input to receive the gear shift position signal, representing eight possible gear shift positions. Alternatively, the gear shift position signal can be received in a communication packet as a numeric value on the port interface 352. The throttle position signal can be received as an analog input value, typically in the range 0-5 volts. Alternatively, the throttle position signal can be received in a communication packet as a numeric value on the port interface 352. The output of other sensors can be processed in a similar fashion.

Other sensors may be included and position in the interior space 108 of the vehicle 104. Generally, these interior sensors obtain data about the health of the driver and/or passenger(s), data about the safety of the driver and/or passenger(s), and/or data about the comfort of the driver and/or passenger(s). The health data sensors can include sensors in the steering wheel that can measure various health telemetry for the person (e.g., heart rate, temperature, blood pressure, blood presence, blood composition, etc.). Sensors in the seats may also provide for health telemetry (e.g., presence of liquid, weight, weight shifts, etc.). Infrared sensors could detect a person's temperature; optical sensors can determine a person's position and whether the person has become unconscious. Other health sensors are possible and included herein.

Safety sensors can measure whether the person is acting safely. Optical sensors can determine a person's position and focus. If the person stops looking at the road ahead, the optical sensor can detect the lack of focus. Sensors in the seats may detect if a person is leaning forward or may be injured by a seat belt in a collision. Other sensors can detect that the driver has at least one hand on a steering wheel. Other safety sensors are possible and contemplated as if included herein.

Comfort sensors can collect information about a person's comfort. Temperature sensors may detect a temperature of the interior cabin. Moisture sensors can determine a relative humidity. Audio sensors can detect loud sounds or other distractions. Audio sensors may also receive input from a person through voice data. Other comfort sensors are possible and contemplated as if included herein.

Figure 5:
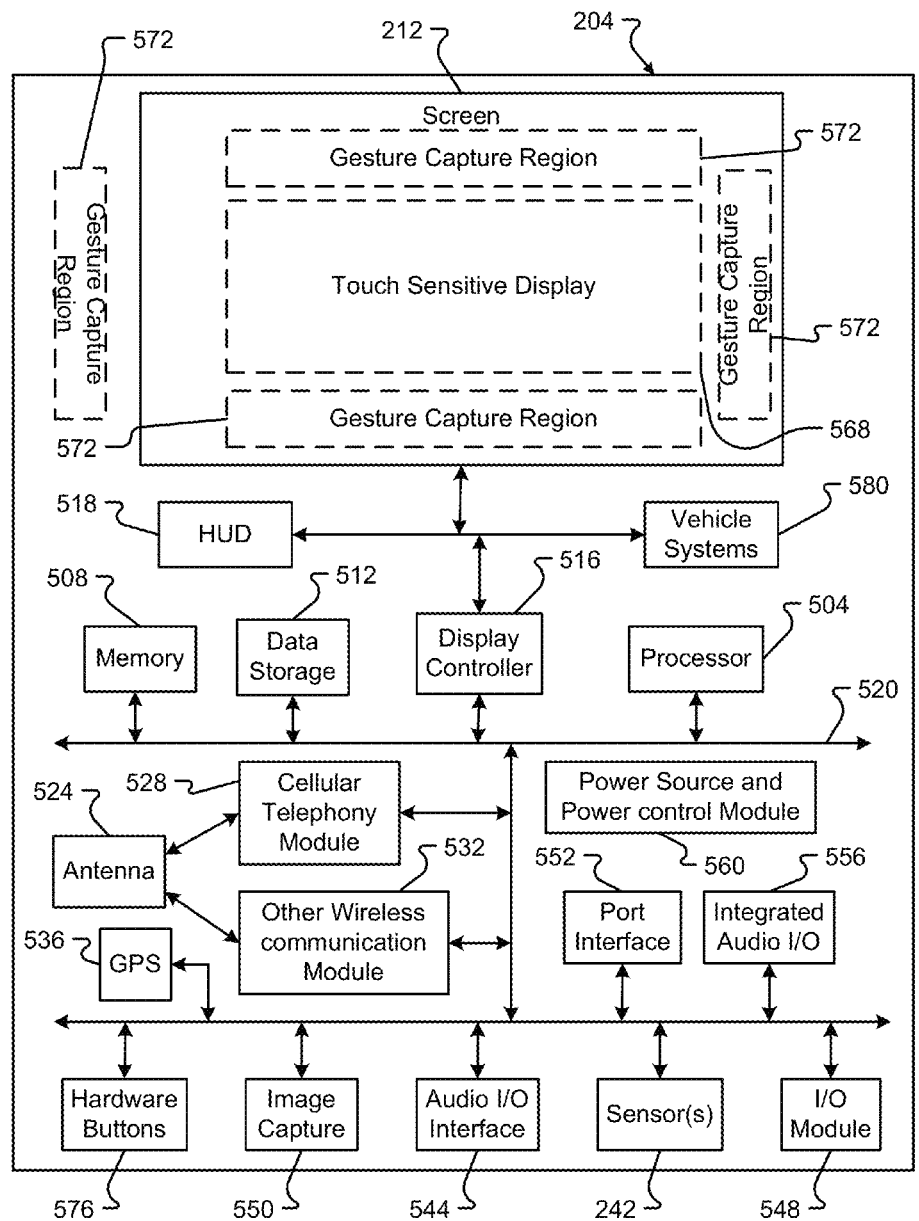
FIG. 5 is a block diagram of an embodiment of a vehicle control system.

An embodiment of a vehicle control system 204 and its associated components 204 may be as shown in FIG. 5. In general, the device 212 includes a front screen 212 with a touch sensitive display 568. The front screen 212 may be disabled and/or enabled by a suitable command. Moreover, the front screen 212 can be touch sensitive and can include different operative areas. For example, a first operative area, within the touch sensitive screen 212, may comprise a touch sensitive display 568. In general, the touch sensitive display 568 may comprise a full color, touch sensitive display. A second area within each touch sensitive screen 568 may comprise a gesture capture region 572. The gesture capture region 572 may comprise one or more areas or regions that is outside of the touch sensitive display 568 area or screen area 212, and that is capable of receiving input, for example in the form of gestures provided by a user. However, the one or more gesture capture regions 572 do not include pixels that can perform a display function or capability.

It is further anticipated that a third region of the touch sensitive screen 568 may comprise one or more configurable areas. The configurable area is capable of receiving input and has display or limited display capabilities. As can be appreciated, the configurable area may occupy any part of the touch sensitive screen 568 not allocated to a gesture capture region 572 or touch sensitive display 568. In embodiments, the configurable area may present different input options to the user. For example, the configurable area may display buttons or other relatable items. Moreover, the identity of displayed buttons, or whether any buttons are displayed at all within the configurable area of the touch sensitive screen 568 may be determined from the context in which the device 212 is used and/or operated. In an exemplary embodiment, the touch sensitive screen 568 comprises liquid crystal display devices extending across at least the region of the touch sensitive screen 568 that is capable of providing visual output to a user, and a resistive and/or capacitive input matrix over the regions of the touch sensitive screen 568 that are capable of receiving input from the user.

One or more display controllers 516 may be provided for controlling the operation of the touch sensitive screen 568, including input (touch sensing) and output (display) functions. In the exemplary embodiment illustrated in FIG. 5, a touch screen controller 516 is provided for the touch screen 568. In accordance with some embodiments, the functions of a touch screen controller 516 may be incorporated into other components, such as a processor 504.

The processor 504 may comprise a general purpose programmable processor or controller for executing application programming or instructions. In accordance with at least some embodiments, the processor 504 may include multiple processor cores, and/or implement multiple virtual processors. In accordance with still other embodiments, the processor 504 may include multiple physical processors. As a particular example, the processor 504 may comprise a specially configured application specific integrated circuit (ASIC) or other integrated circuit, a digital signal processor, a controller, a hardwired electronic or logic circuit, a programmable logic device or gate array, a special purpose computer, or the like. The processor 504 generally functions to run programming code or instructions implementing various functions of the device 212.

A device 212 may also include memory 508 for use in connection with the execution of application programming or instructions by the processor 504, and for the temporary or long term storage of program instructions and/or data. As examples, the memory 508 may comprise RAM, DRAM, SDRAM, or other solid state memory. Alternatively or in addition, data storage 512 may be provided. Like the memory 508, the data storage 512 may comprise a solid state memory device or devices. Alternatively or in addition, the data storage 512 may comprise a hard disk drive or other random access memory.

In support of communications functions or capabilities, the device 212 can include a cellular telephony module 528. As examples, the cellular telephony module 528 can comprise a GSM, CDMA, FDMA and/or analog cellular telephony transceiver capable of supporting voice, multimedia and/or data transfers over a cellular network. Alternatively or in addition, the device 212 can include an additional or other wireless communications module 532. As examples, the other wireless communications module 532 can comprise a Wi-Fi, BLUETOOTH™™, WiMax, infrared, or other wireless communications link. The cellular telephony module 528 and the other wireless communications module 532 can each be associated with a shared or a dedicated antenna 524.

A port interface 552 may be included. The port interface 552 may include proprietary or universal ports to support the interconnection of the device 212 to other devices or components, such as a dock, which may include additional or different capabilities from those integral to the device 212. In addition to supporting an exchange of communication signals between the device 212 and another device or component, the docking port (not shown) and/or port interface 552 can support the supply of power to or from the device 212. The port interface 552 also comprises an intelligent element that comprises a docking module for controlling communications or other interactions between the device 212 and a connected device or component.

An input/output module 548 and associated ports may be included to support communications over wired networks or links, for example with other communication devices, server devices, and/or peripheral devices. Examples of an input/output module 548 include an Ethernet port, a Universal Serial Bus (USB) port, Institute of Electrical and Electronics Engineers (IEEE) 1594, or other interface.

An audio input/output interface/device(s) 544 can be included to provide analog audio to an interconnected speaker or other device, and to receive analog audio input from a connected microphone or other device. As an example, the audio input/output interface/device(s) 544 may comprise an associated amplifier and analog to digital converter. Alternatively or in addition, the device 212 can include an integrated audio input/output device 556 and/or an audio jack for interconnecting an external speaker or microphone. For example, an integrated speaker and an integrated microphone can be provided, to support near talk or speaker phone operations.

Hardware buttons 280 can be included for example for use in connection with certain control operations. Examples include a master power switch, volume control, etc., as described in conjunction with FIG. 2. One or more image capture interfaces/devices, such as a camera, can be included for capturing still and/or video images. Alternatively or in addition, an image capture interface/device can include a scanner or code reader. An image capture interface/device can include or be associated with additional elements, such as a flash or other light source.

The device 212 can also include a global positioning system (GPS) receiver 536. In accordance with embodiments of the present invention, the GPS receiver 536 may further comprise a GPS module that is capable of providing absolute location information to other components of the device 212. Other sensors 242 may also be included. For example, an accelerometer(s)/gyroscope(s) may also be included. For example, in connection with the display of information to a user and/or other functions, a signal from the accelerometer/gyroscope can be used to determine an orientation and/or format in which to display that information to the user. In some embodiments, the accelerometer/gyroscope may comprise at least one accelerometer and at least one gyroscope.

Embodiments of the present invention can also include one or more magnetic sensing feature. The magnetic sensing feature can be configured to provide a signal indicating the position of the device relative to a vehicle-mounted position. This information can be provided as an input, for example to a user interface application, to determine an operating mode, characteristics of the touch sensitive display 568 and/or other device 212 operations. As examples, a magnetic sensing feature can comprise one or more of Hall-effect sensors, a multiple position switch, an optical switch, a Wheatstone bridge, a potentiometer, or other arrangement capable of providing a signal indicating of multiple relative positions the touch screens are in. Alternatively, the magnetic sensing feature may comprise one or more metallic elements used by other sensors associated with the console and/or vehicle to determine whether the device 212 is in a vehicle-mounted position. These metallic elements may include but are not limited to rare-earth magnets, electromagnets, ferrite and/or ferrite alloys, and/or other material capable of being detected by a range of sensors.

Communications between various components of the device 212 can be carried by one or more buses 520. In addition, power can be supplied to the components of the device 212 from a power source and/or power control module 560. The power control module 560 can, for example, include a battery, an AC to DC converter, power control logic, and/or ports for interconnecting the device 212 to an external source of power.

Figure 6:
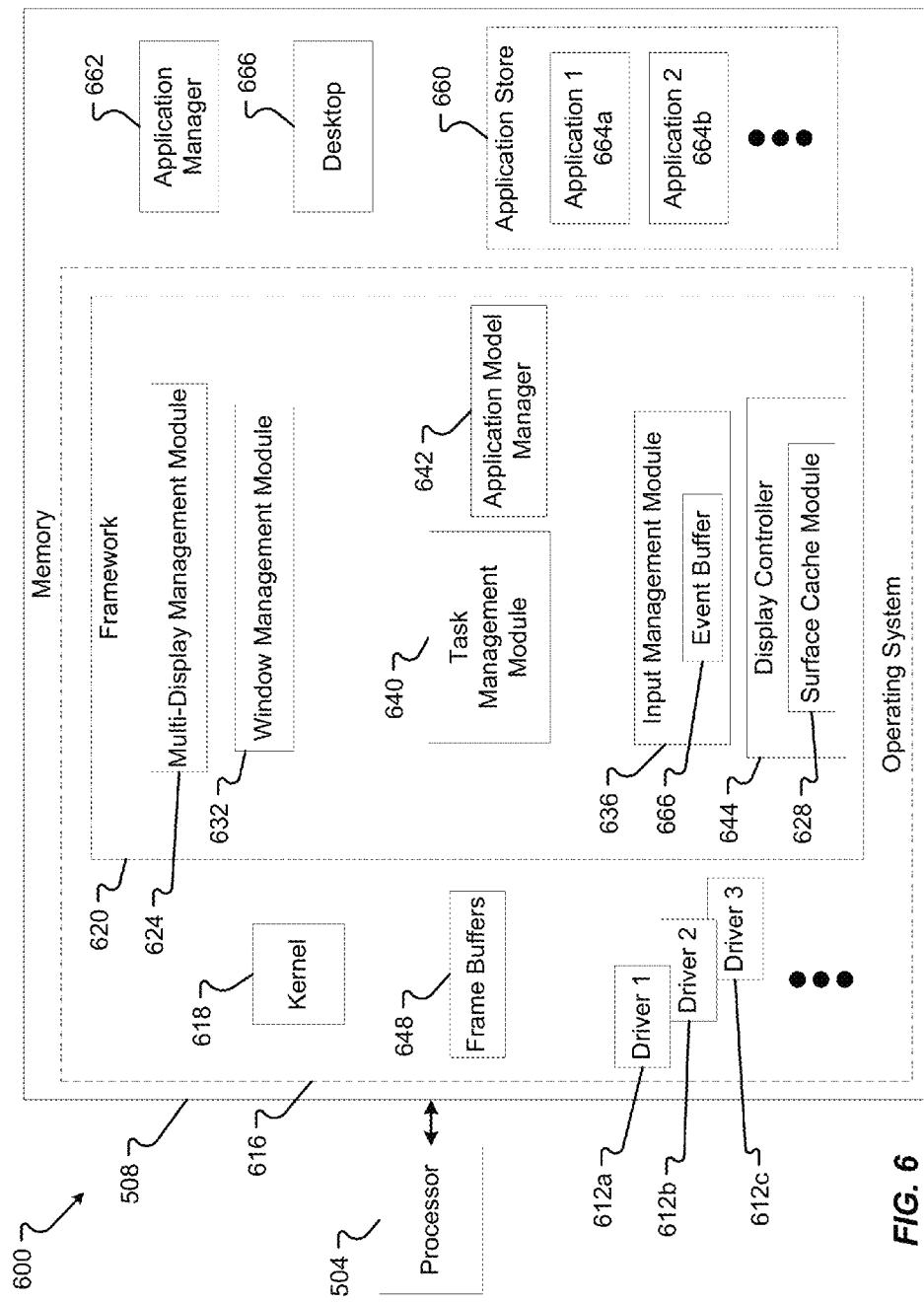
FIG. 6 another block diagram of an embodiment of a vehicle control system.

An embodiment of one or more software modules that may be associated with the vehicle control system 204 may be as shown in FIG. 6. The memory 508 may store and the processor 504 may execute one or more software components. These components can include at least one operating system (OS) 616, an application manager 662, a console desktop 666, and/or one or more applications 664a and/or 664b from an application store 660. The OS 616 can include a framework 620, one or more frame buffers 648, one or more drivers 612, and/or a kernel 618. The OS 616 can be any software, consisting of programs and data, which manages computer hardware resources and provides common services for the execution of various applications 664. The OS 616 can be any operating system and, at least in some embodiments, dedicated to mobile devices, including, but not limited to, Linux, ANDROID™, iPhone OS (IOS™), WINDOWS PHONE 7™, etc. The OS 616 is operable to provide functionality to the device 212 by executing one or more operations, as described herein.

The applications 664 can be any higher level software that executes particular console functionality for the user. Applications 664 can include programs such as vehicle control applications, email clients, web browsers, texting applications, games, media players, office suites, etc. The applications 664 can be stored in an application store 660, which may represent any memory or data storage, and the management software associated therewith, for storing the applications 664. Once executed, the applications 664 may be run in a different area of memory 608.

The framework 620 may be any software or data that allows the multiple tasks running on the device to interact. In embodiments, at least portions of the framework 620 and the discrete components described hereinafter may be considered part of the OS 616 or an application 664. However, these portions will be described as part of the framework 620, but those components are not so limited. The framework 620 can include, but is not limited to, a Surface Cache module 628, a Window Management module 632, an Input Management module 636, an Application Model Manager 642, a Display Controller 644, one or more frame buffers 648, and/or an event buffer 666.

The Surface Cache module 628 includes any memory or storage and the software associated therewith to store or cache one or more images of applications, windows, and/or console screens. A series of active and/or non-active windows (or other display objects, such as, a desktop display) can be associated with each display. An active window (or other display object) is currently displayed. A non-active window (or other display objects) was opened and, at some time, displayed but are now not displayed. To enhance the user experience, before a window transitions from an active state to an inactive state, a "screen shot" of a last generated image of the window (or other display object) can be stored. The Surface Cache module 628 may be operable to store a bitmap of the last active image of a window (or other display object) not currently displayed. Thus, the Surface Cache module 628 stores the images of non-active windows (or other display objects) in a data store.

In embodiments, the Window Management module 632 is operable to manage the windows (or other display objects) that are active or not active on each of the displays. The Window Management module 632, based on information from the OS 616, or other components, determines when a window (or other display object) is visible or not active. The Window Management module 632 may then put a non-visible window (or other display object) in a "not active state" and, in conjunction with the Task Management module 640 suspends the application's operation. Further, the Window Management module 632 may assign a display identifier to the window (or other display object) or manage one or more other items of data associated with the window (or other display object). The Window Management module 632 may also provide the stored information to the application 664, or other components interacting with or associated with the window (or other display object). The Window Management module 632 can also associate an input task with a window based on window focus and display coordinates within the motion space.

The Input Management module 636 is operable to manage events that occur with the device. An event is any input into the window environment, for example, a user interface interactions with a user. The Input Management module 636 receives the events and logically stores the events in an event buffer 656. Events can include such user interface interactions as a "down event," which occurs when the screen 204 receives a touch signal from a user, a "move event," which occurs when the screen 204 determines that a user's finger is moving across a screen(s), an "up event", which occurs when the device 212 determines that the user has stopped touching the screen 568 etc. These events are received, stored, and forwarded to other modules by the Input Management module 636. The Input Management module 636 may also map screen inputs to a motion space which is the culmination of all physical and virtual display available on the device.

The frame buffer 648 is a logical structure(s) used to render the user interface. The frame buffer 648 can be created and destroyed by the OS kernel 618. However, the Display Controller 644 can write the image data, for the visible windows, into the frame buffer 648. A frame buffer 648 can be associated with one screen or multiple screens. The association of a frame buffer 648 with a screen can be controlled dynamically by interaction with the OS kernel 618. A composite display may be created by associating multiple screens with a single frame buffer 648. Graphical data used to render an application's window user interface may then be written to the single frame buffer 648, for the composite display, which is output to the multiple screens 204. The Display Controller 644 can direct an application's user interface to a portion of the frame buffer 648 that is mapped to a particular display 208, thus, displaying the user interface on only one screen 212. The Display Controller 644 can extend the control over user interfaces to multiple applications, controlling the user interfaces for as many displays as are associated with a frame buffer 648 or a portion thereof. This approach compensates for the physical screen 212 and any other console screens that are in use by the software component above the Display Controller 644.

The Application Manager 662 is an application that provides a presentation layer for the window environment. Thus, the Application Manager 662 provides the graphical model for rendering. Likewise, the Desktop 666 provides the presentation layer for the Application Store 660. Thus, the desktop provides a graphical model of a surface having selectable application icons for the Applications 664 in the Application Store 660 that can be provided to the Window Management Module 632 for rendering.

Further, the framework can include an Application Model Manager (AMM) 642. The Application Manager 662 may interface with the AMM 642. In embodiments, the AMM 642 receives state change information from the device 212 regarding the state of applications (which are running or suspended). The AMM 642 can associate bit map images from the Surface Cache Module 628 to the applications that are alive (running or suspended). Further, the AMM 642 may provide a list of executing applications to the Application Manager 662.

One or more gestures used to interface with the vehicle control system 204 may be as described in conjunction with FIGS. 7A through 7K. FIGS. 7A through 7H depict various graphical representations of gesture inputs that may be recognized by the screen(s) 212. The gestures may be performed not only by a user's body part, such as a digit, but also by other devices, such as a stylus, that may be sensed by the contact sensing portion(s) of a screen 212. In general, gestures are interpreted differently, based on where the gestures are performed (either directly on the display 568 or in the gesture capture region 572). For example, gestures in the display 568 may be directed to a desktop or application, and gestures in the gesture capture region 572 may be interpreted as for the system.

With reference to FIGS. 7A-7H, a first type of gesture, a touch gesture 720, is substantially stationary on the screen 212 for a selected length of time. A circle 728 represents a touch or other contact type received at particular location of a contact sensing portion of the screen. The circle 728 may include a border 732, the thickness of which indicates a length of time that the contact is held substantially stationary at the contact location. For instance, a tap 720 (or short press) has a thinner border 732a than the border 732b for a long press 724 (or for a normal press). The long press 724 may involve a contact that remains substantially stationary on the screen for longer time period than that of a tap 720. As will be appreciated, differently defined gestures may be registered depending upon the length of time that the touch remains stationary prior to contact cessation or movement on the screen.

Figure 7A:
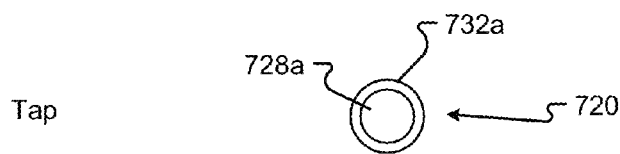
FIG. 7A is a graphical representation of an embodiment of a gesture that a user may perform to provide input to a vehicle control system.
Figure 7B:
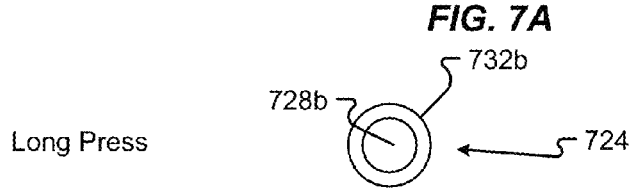
FIG. 7B is a graphical representation of an embodiment of a gesture that a user may perform to provide input to a vehicle control system.
Figure 7C:
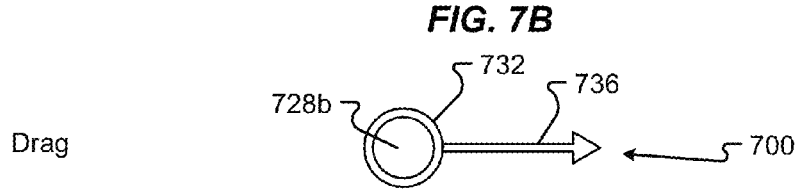
FIG. 7C is a graphical representation of an embodiment of a gesture that a user may perform to provide input to a vehicle control system.

With reference to FIG. 7C, a drag gesture 700 on the screen 212 is an initial contact (represented by circle 728) with contact movement 736 in a selected direction. The initial contact 728 may remain stationary on the screen 212 for a certain amount of time represented by the border 732. The drag gesture typically requires the user to contact an icon, window, or other displayed image at a first location followed by movement of the contact in a drag direction to a new second location desired for the selected displayed image. The contact movement need not be in a straight line but have any path of movement so long as the contact is substantially continuous from the first to the second locations.

Figure 7D:
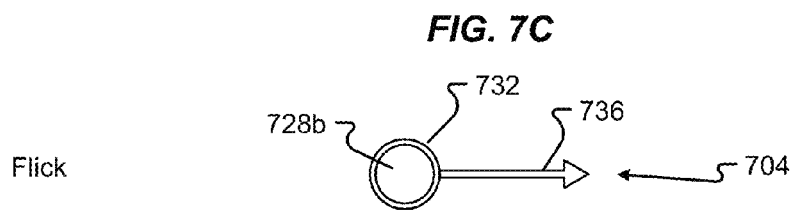
FIG. 7D is a graphical representation of an embodiment of a gesture that a user may perform to provide input to a vehicle control system.

With reference to FIG. 7D, a flick gesture 704 on the screen 212 is an initial contact (represented by circle 728) with truncated contact movement 736 (relative to a drag gesture) in a selected direction. In embodiments, a flick has a higher exit velocity for the last movement in the gesture compared to the drag gesture. The flick gesture can, for instance, be a finger snap following initial contact. Compared to a drag gesture, a flick gesture generally does not require continual contact with the screen 212 from the first location of a displayed image to a predetermined second location. The contacted displayed image is moved by the flick gesture in the direction of the flick gesture to the predetermined second location. Although both gestures commonly can move a displayed image from a first location to a second location, the temporal duration and distance of travel of the contact on the screen is generally less for a flick than for a drag gesture.

Figure 7E:
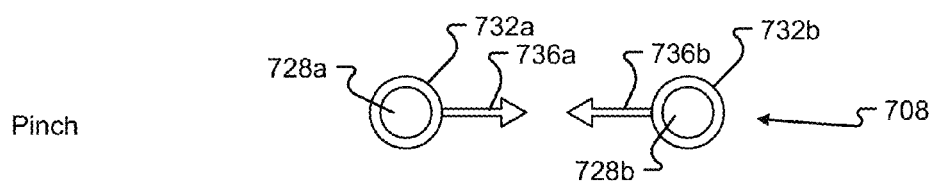
FIG. 7E is a graphical representation of an embodiment of a gesture that a user may perform to provide input to a vehicle control system.

With reference to FIG. 7E, a pinch gesture 708 on the screen 212 is depicted. The pinch gesture 708 may be initiated by a first contact 728 to the screen 212 by, for example, a first digit and a second contact 728b to the screen 212 by, for example, a second digit. The first and second contacts 728a,b may be detected by a common contact sensing portion of a common screen 212, by different contact sensing portions of a common screen 212, or by different contact sensing portions of different screens 212. The first contact 728a is held for a first amount of time, as represented by the border 732a, and the second contact 728b is held for a second amount of time, as represented by the border 732b. The first and second amounts of time are generally substantially the same, and the first and second contacts 728a,b generally occur substantially simultaneously. The first and second contacts 728a,b generally also include corresponding first and second contact movements 736a,b, respectively. The first and second contact movements 736 a,b are generally in opposing directions. Stated another way, the first contact movement 736a is towards the second contact 736b, and the second contact movement 736b is towards the first contact 736a. More simply stated, the pinch gesture 708 may be accomplished by a user's digits touching the screen 212 in a pinching motion.

Figure 7F:
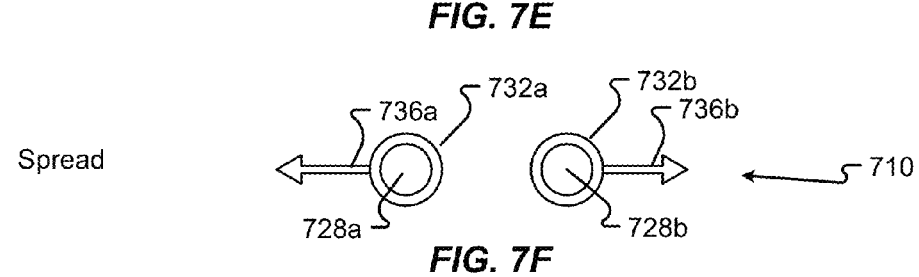
FIG. 7F is a graphical representation of an embodiment of a gesture that a user may perform to provide input to a vehicle control system.

With reference to FIG. 7F, a spread gesture 710 on the screen 212 is depicted. The spread gesture 710 may be initiated by a first contact 728a to the screen 212 by, for example, a first digit and a second contact 728b to the screen 212 by, for example, a second digit. The first and second contacts 728a,b may be detected by a common contact sensing portion of a common screen 212, by different contact sensing portions of a common screen 212, or by different contact sensing portions of different screens 212. The first contact 728a is held for a first amount of time, as represented by the border 732a, and the second contact 728b is held for a second amount of time, as represented by the border 732b. The first and second amounts of time are generally substantially the same, and the first and second contacts 728a,b generally occur substantially simultaneously. The first and second contacts 728a,b generally also include corresponding first and second contact movements 736a,b, respectively. The first and second contact movements 736a,b are generally in a common direction. Stated another way, the first and second contact movements 736a,b are away from the first and second contacts 728a,b. More simply stated, the spread gesture 710 may be accomplished by a user's digits touching the screen 212 in a spreading motion.

Figure 7G:
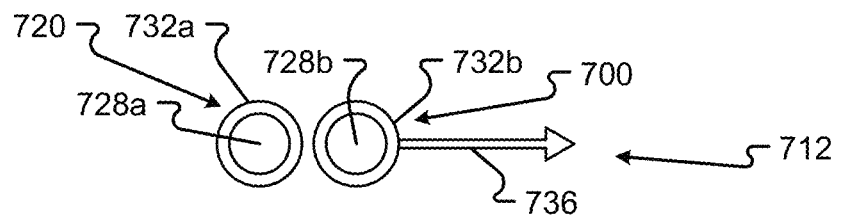
FIG. 7G is a graphical representation of an embodiment of a gesture that a user may perform to provide input to a vehicle control system.
Figure 7H:
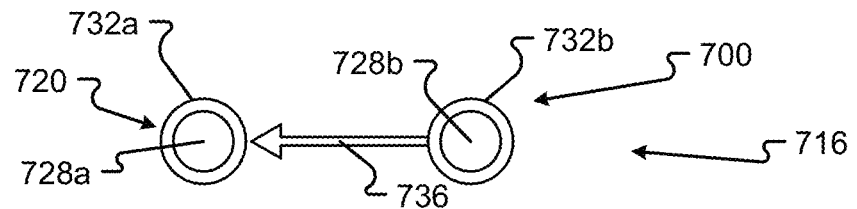
FIG. 7H is a graphical representation of an embodiment of a gesture that a user may perform to provide input to a vehicle control system.

The above gestures may be combined in any manner, such as those shown by FIGS. 7G and 7H, to produce a determined functional result. For example, in FIG. 7G a tap gesture 720 is combined with a drag or flick gesture 712 in a direction away from the tap gesture 720. In FIG. 7H, a tap gesture 720 is combined with a drag or flick gesture 712 in a direction towards the tap gesture 720.

The functional result of receiving a gesture can vary depending on a number of factors, including a state of the vehicle 104, display 568, or screen 212, a context associated with the gesture, or sensed location of the gesture. The state of the vehicle commonly refers to one or more of a configuration of the vehicle 104, a display orientation, and user and other inputs received by the vehicle 104. Context commonly refers to one or more of the particular application(s) selected by the gesture and the portion(s) of the application currently executing, whether the application is a single- or multi-screen application, and whether the application is a multi-screen application displaying one or more windows. Sensed location of the gesture commonly refers to whether the sensed set(s) of gesture location coordinates are on a touch sensitive display 568 or a gesture capture region 572, whether the sensed set(s) of gesture location coordinates are associated with a common or different display or screen 212, and/or what portion of the gesture capture region contains the sensed set(s) of gesture location coordinates.

A tap, when received by an a touch sensitive display 568, can be used, for instance, to select an icon to initiate or terminate execution of a corresponding application, to maximize or minimize a window, to reorder windows in a stack, and to provide user input such as by keyboard display or other displayed image. A drag, when received by a touch sensitive display 568, can be used, for instance, to relocate an icon or window to a desired location within a display, to reorder a stack on a display, or to span both displays (such that the selected window occupies a portion of each display simultaneously). A flick, when received by a touch sensitive display 568 or a gesture capture region 572, can be used to relocate a window from a first display to a second display or to span both displays (such that the selected window occupies a portion of each display simultaneously). Unlike the drag gesture, however, the flick gesture is generally not used to move the displayed image to a specific user-selected location but to a default location that is not configurable by the user.

The pinch gesture, when received by a touch sensitive display 568 or a gesture capture region 572, can be used to minimize or otherwise increase the displayed area or size of a window (typically when received entirely by a common display), to switch windows displayed at the top of the stack on each display to the top of the stack of the other display (typically when received by different displays or screens), or to display an application manager (a "pop-up window" that displays the windows in the stack). The spread gesture, when received by a touch sensitive display 568 or a gesture capture region 572, can be used to maximize or otherwise decrease the displayed area or size of a window, to switch windows displayed at the top of the stack on each display to the top of the stack of the other display (typically when received by different displays or screens), or to display an application manager (typically when received by an off-screen gesture capture region on the same or different screens).

The combined gestures of FIG. 7G, when received by a common display capture region in a common display or screen 212, can be used to hold a first window location constant for a display receiving the gesture while reordering a second window location to include a window in the display receiving the gesture. The combined gestures of FIG. 7H, when received by different display capture regions in a common display or screen 212 or in different displays or screens, can be used to hold a first window location for a display receiving the tap part of the gesture while reordering a second window location to include a window in the display receiving the flick or drag gesture. Although specific gestures and gesture capture regions in the preceding examples have been associated with corresponding sets of functional results, it is to be appreciated that these associations can be redefined in any manner to produce differing associations between gestures and/or gesture capture regions and/or functional results.

Figure 7I:
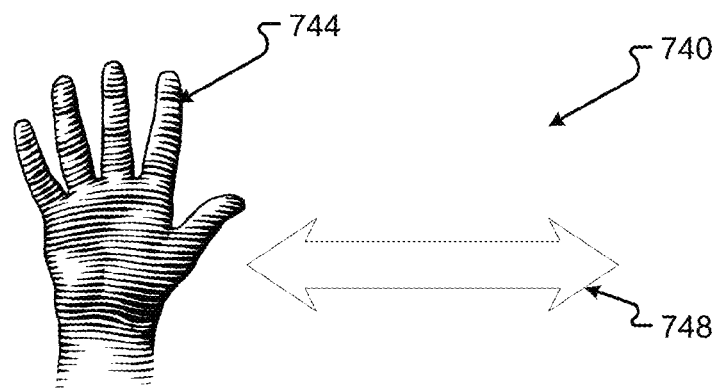
FIG. 7I is a graphical representation of an embodiment of a gesture that a user may perform to provide input to a vehicle control system.
Figure 7J:
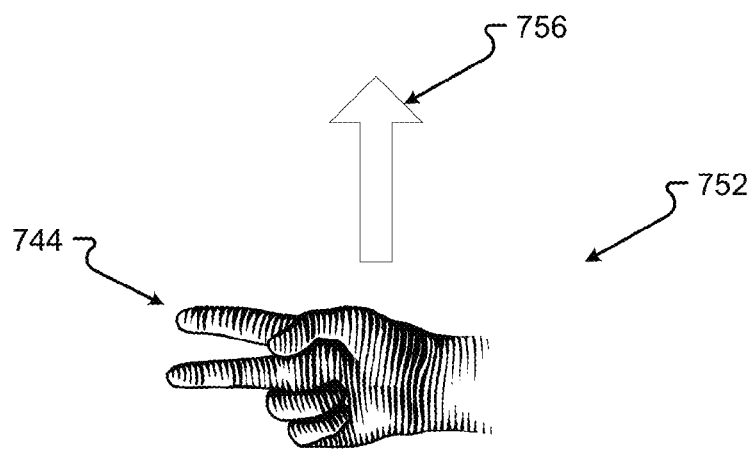
FIG. 7J is a graphical representation of an embodiment of a gesture that a user may perform to provide input to a vehicle control system.
Figure 7K:
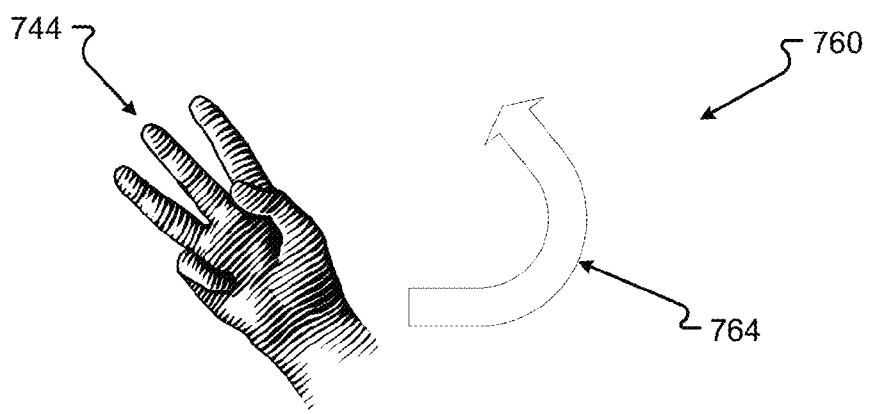
FIG. 7K is a graphical representation of an embodiment of a gesture that a user may perform to provide input to a vehicle control system.

Gestures that may be completed in three-dimensional space and not on a touch sensitive screen 568 or gesture capture region 572 may be as shown in FIGS. 7I through 7K. The gestures may be completed in an area where a sensor 242, such as an optical sensor, infrared sensor, or other type of sensor, may detect the gesture. For example, the gesture 740 in FIG. 7I, a person may open their hand 764 and move their hand in a back and forth direction 748 as a gesture 740 to complete some function with the vehicle 104. For example gesture 764 may change the station of the radio in the vehicle 104. The sensors 242 may both determine the configuration of the hand and the vector of the movement. The vector and hand configuration can be interpreted to mean certain things to the vehicle control system 204 and produce different results.

In another example of a gesture 752 in FIG. 7J, a user may configure their hand 764 to extend two fingers and move the hand in an up and down operation 756. This gesture 752 may control the volume of the radio or some other function. Again, the sensors 242 may determine how the person has configured their hand gesture, and the vector of the movement. In another example of a gesture 760 shown in FIG. 7K, a user may extend their middle three fingers at an angle 45° from straight vertical and circle the hand in a counter-clockwise motion 764. This gesture 760 may cause the automobile to change the heat or do some other function. As can be understood by one skilled in the art, the configurations of the hand and the types of movement are variable. Thus, the user may configure the hand 764 in any way imaginable and may also move that hand 764 in any direction with any vector in three-dimensional space.

The gestures 740, 752, 760, as shown in FIG. 7I through 7K, may occur in a predetermined volume of space within the vehicle 104. For example, a sensor 242 may be configured to identify such gestures 740, 752, 760 between the front passenger's and front driver's seats over a console area within the passenger compartment of the automobile 104. The gestures 740, 752, 760 may be made within area 1 304a between zones A 312a and B 312b. However, there may be other areas 308 where a user may use certain gestures, where sensors 242 may be able to determine a certain function is desired. Gestures that may be similar but used in different areas within the vehicle 104 may cause different functions to be performed. For example, the gesture 740 in FIG. 7I, if used in zone E 312e, may change the heat provided in zone E 312e, but may change the station of a radio if used in zone A 312a. Further, the gestures may be made with other body parts or, for example, different expressions of a persons' face may be used to control functions in the vehicle 104. Also, the user may use two hands in some circumstances or do other types of physical movements that can cause different reactions in the vehicle 104.

Figure 8:
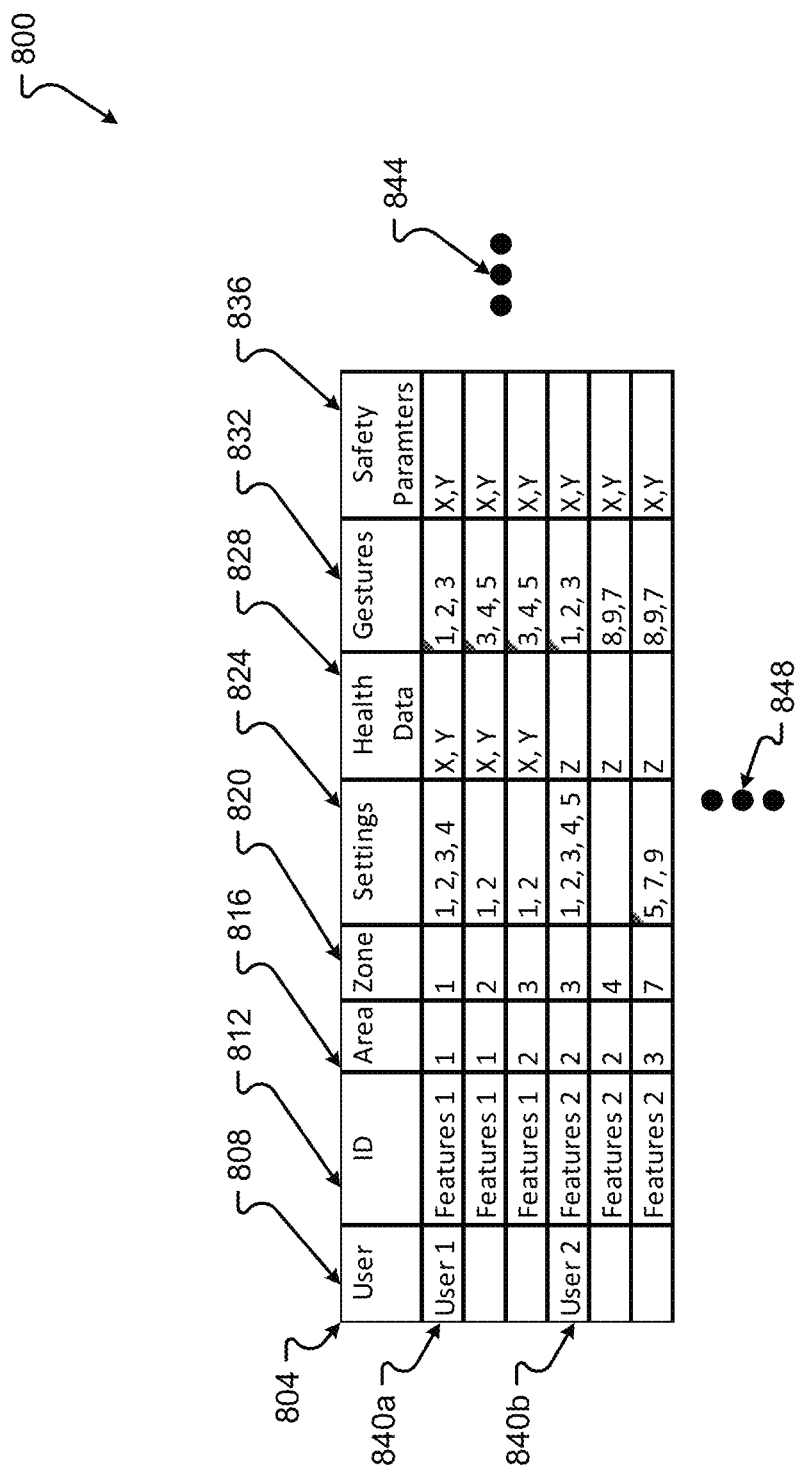
FIG. 8 is a diagram of an embodiment of a data structure for storing information about a user of a vehicle.

An embodiment of a data structure 800 to store different settings is shown in FIG. 8. The data structure 800 may include one or more of data files or data objects 804. Thus, the data structure 800 may represent different types of data bases or data storage, for example, object-oriented data bases, flat file data structures, relational database, or other types of data storage arrangements. The data file 804 may include several portions 808-836 representing different types of data. Each of these types of data may be associated with a user, as shown in portion 808.

There may be one or more user records 840 and associated data stored within the data file 804. The user can be any person that uses or rides within the vehicle or conveyance 104. The user may be identified in portion 812. For the vehicle 104, the user may include a set of one or more features that may identify the user. These features may be the physical characteristics of the person that may be identified by facial recognition or some other type of system. In other embodiments, the user may provide a unique code to the vehicle control system 204 or provide some other type of data that allows the vehicle control system 204 to identify the user. The features or characteristics of the user are then stored in portion 812.

Each user identified in portion 808 may have a different set of settings for each area 308 and/or each zone 312 within the vehicle 104. Thus, each set of setting may also be associated with a predetermined zone 312 or area 308. The zone 312 is stored in portion 820 and the area 308 is stored in portion 816.

One or more settings may be stored in portion 824. These settings 824 may be the configurations of different functions within the vehicle 104 that are specified by or for that user. For example, the settings 824 may be the position of a seat, the position of a steering wheel, a heating/cooling setting, a radio setting, a cruise control setting, or some other type of setting associated with the vehicle 104. Further, in vehicles adapted to have a configurable console or a configurable dash or heads-up display, the settings 824 may also provide for how that heads-up display, dash, or console are configured for this particular user. Each setting 824 may be associated with a different area 308 or zone 312. Thus, there may be more settings 824 for when the user is the driver and in zone A, 312A, of area 1, 308A. However, there may be similar settings 824 among the different zones 312 or areas 308 as shown in portion 824. For example, the heating or radio settings for the user may be similar in every zone 312.

The sensors 242 within the vehicle 104 may be able to either obtain or track health data in portion 828. Health data 828 may include any type of physical characteristic associated with the user. For example, a heart rate, a blood pressure, a temperature, or other types of heath data may be obtained and stored in portion 828. The user may have this health data tracked over a period of time to allow for statistical analysis of the user's health while operating the vehicle 104. In this way if some function of the user's health deviates from a norm, the vehicle 104 may be able to determine there is a problem with the person and react to that data.

One or more gestures may be stored in portion 832. Thus, the gestures used and described in conjunction FIG. 7A through 7K may be configurable. These gestures may be determined or created by the user and stored in portion 832. A user may have different gestures for each zone 312 or area 308 within the vehicle. The gestures that do certain things while driving may do other things while in a different area 308 of the vehicle 104. Thus, the user may use a first set of gestures while driving and a second set while a passenger. Further, one or more users may share gestures as shown in portion 832. Each driver may have a common set of gestures that they use in zone A, 312a. Each of these gestures may be determined or captured and then stored with their average characteristics (e.g., vector, position of gesture, etc.) in portion 832.

One or more sets of safety parameters may be stored in portion 836. Safety parameters 836 may be common operating characteristics for this driver/passenger or for all drivers/passengers that if deviated from may determine there is a problem with the driver/passenger or the vehicle 104. For example, a certain route may be taken repeatedly and an average speed or mean speed may be determined. If the mean speed deviates by some number of standard deviations, a problem with the vehicle 104 or the user may be determined. In another example, the health characteristics or driving experience of the user may be determined. If the user drives in a certain position where their head occupies a certain portion of three-dimensional space within the vehicle 104, the vehicle control system 204 may determine that the safety parameter includes the users face or head being within this certain portion of the vehicle interior space. If the user's head deviates from that interior space for some amount of time, the vehicle control system 204 can determine that something is wrong with the driver and change the function or operation of the vehicle 104 to assist the driver. This may happen, for example, when a user falls asleep at the wheel. If the user's head droops and does no longer occupy a certain three dimensional space, the vehicle control system 204 can determine that the driver has fallen asleep and may take control of the operation of the vehicle 204 and steer the vehicle 204 to the side of the road. In other examples, if the user's reaction time is too slow or some other safety parameter is not nominal, the vehicle control system 204 may determine that the user is inebriated or having some other medical problem. The vehicle control system 204 may then assume control of the vehicle to ensure that the driver is safe.

Figure 9:
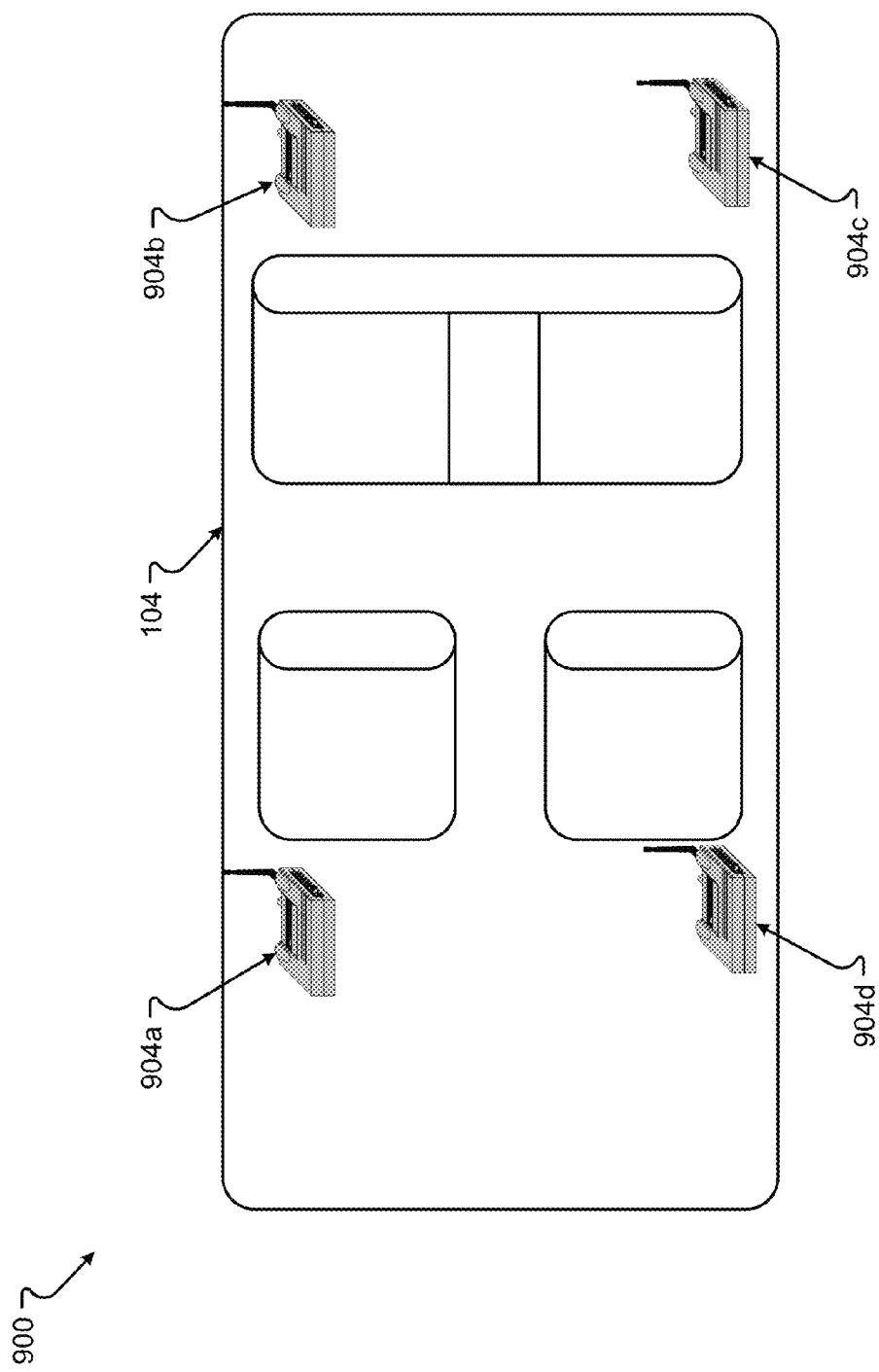
FIG. 9 is a representation of a vehicle interior that shows an embodiment of an antenna placement configuration.

An embodiment for communication system configuration 900 is shown in FIG. 9. Here, the vehicle 104 is shown with an interior cabin. The interior cabin may include two or more different communication transceivers 904. The communication transceivers 904 may be positioned within the vehicle cabin as to provide for signal identification and location. For example, the communication transceivers 904a, 904b, 904c, and 904d are currently located at the corners or extents of the interior cabin of the vehicle 104. In this way, signals received by the communication transceivers 904 may be studied or analyzed to identify the origin location of the signal. As such, the communication transceivers 904 can create a geo-fence (i.e., a virtual perimeter for a real-world geographic area) around the vehicle 104 that allows the communication system to determine whether received signals are currently originating inside the vehicle 104.

Figure 10:
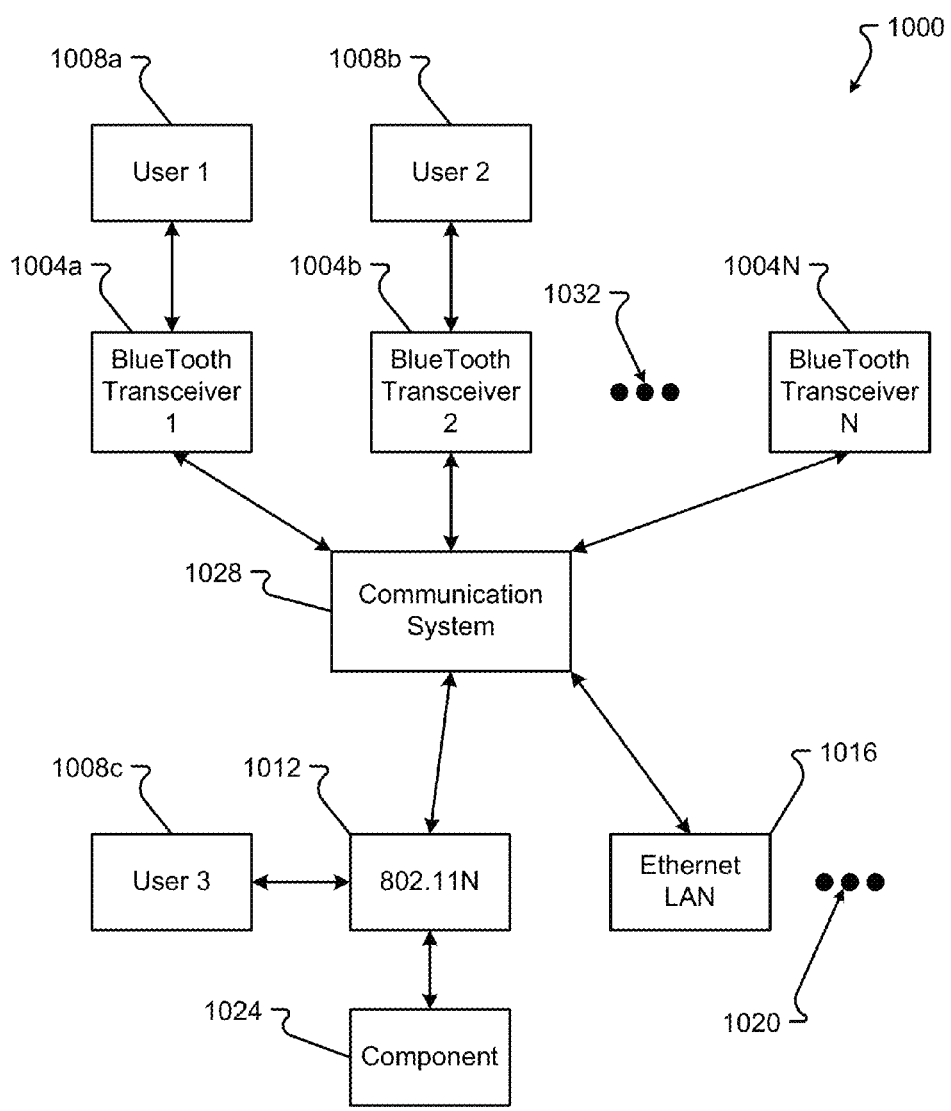
FIG. 10 is a block diagram of an embodiment of a communication system.

An embodiment of a communication system or network 1000 is shown in FIG. 10. The communication system 1000 can include two or more BLUETOOTH™ transceivers 1004. Each BLUETOOTH™ transceiver 1004 may be paired with a single-user device 1008. Thus, BLUETOOTH™ transceiver 1 1004A may communicate with user 1 device 1008A. There may be any number of different BLUETOOTH™ transceivers as represented by ellipses 1032. BLUETOOTH™ transceivers 1004 may conduct communications using the BLUETOOTH™ protocol with the user device 1008. Information received and/or sent to the user device 1008 may originate from the communication system 1028. An embodiment of a communication system is as provided in FIG. 11.

The communication system 1000 may also include other communication components that can communicate with different protocols. For example, communication module 1012 may can communicate using an 802.11, 802.11G, or other wireless LAN protocol. The wireless LAN router/antenna 1012 may communicate with another user 1008c or other components 1024. Thus, those users or components not able to communicate through the array of BLUETOOTH™ transceivers 1004 may still communicate to the vehicle communication system 1028. Other types of communication devices or components may include an Ethernet LAN 1016. The Ethernet LAN 1016 may include one or more hard-wired ports that may be connected within the vehicle 104. There may be other types of protocols or systems used to communicate with the communication system 1028, as represented by ellipses 1020. The components within the communication system 1000 may be hardware and/or software and may operate as understood in the art as associated with these communication protocols.

Figure 11:
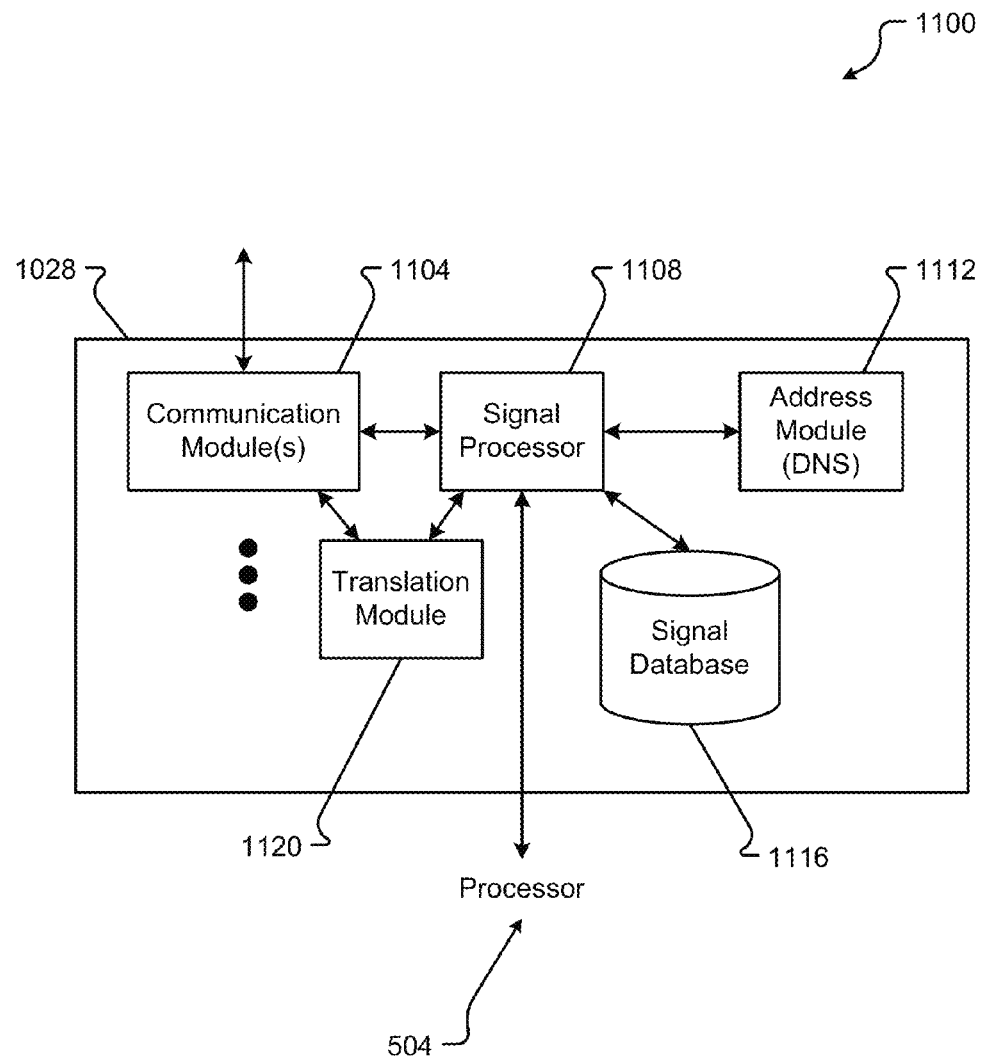
FIG. 11 is a block diagram of another embodiment of a communication system.

An embodiment of a communication system 1028 is shown in FIG. 11. The communication system 1028 may include two or more communication modules 1104. Each communication module may communicate with a particular type of communication component, for example, the BLUETOOTH™ transceivers 1004, the 802.11 router 1012, or other types of communication systems. The system communication module 1104 may be operable to interface with a single type of communication component, but provide those signals to a common signal processor 1108. A translation module 1120 may be operable to translate the received or sent signals into a common format for the signal processor 1108. The translation module 1120 thus may make the signals system or protocol agnostic for the signal processor 1108, but also allow the use of different and varying communication modules 1104.

The signal processor 1108 may be operable to analyze signal characteristics, relay messages, or do other types of processing for the communication system 1028. A signal processor 1108 can receive signal data from the communication modules 1104. This data may include time stamps, signal attenuation characteristics, Doppler shift characteristics, and other types of characteristics about the signal. The signal data may then be analyzed with the signal processor 1108 to determine the location of the source of the signal. This location determination may then be used to determine whether a user is provided access to the communication system 1028.

If access is granted, the address module 1112 may provide an address to the device to provide for inter-device communication or communication from the vehicle 104 to the device. The address module 1112 may be a domain name server (DNS) or other type of addressing system. The signal processor 1108 may also store data about the signal, the device associated with the signal, the user associated with the signal, or other data in a signal data database 1116. The database 1116 may be any type of data structure or data-storage system, for example, an object-oriented database, flat file database, or other types of databases. The data may include any data received and/or processed by the signal processor 1108 and used to identify the source location of the signals. The information in the database 1116 may be accessed, stored, or managed by the signal processor 1108. The signals received by the signal processor 1108 may be sent from or sent to the processor 504 in the vehicle control system 204.

Figure 12A:
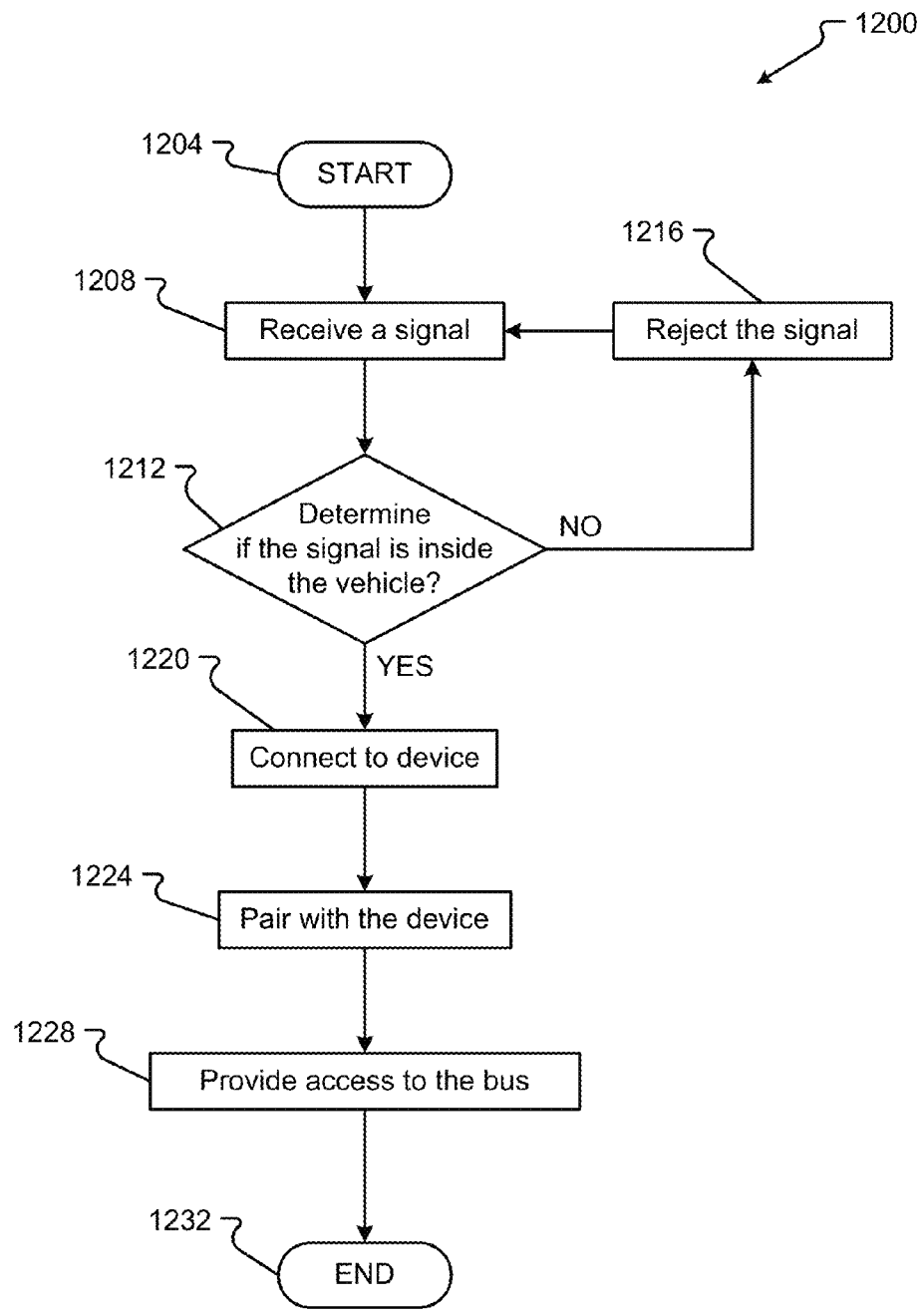
FIG. 12A is a flow diagram of a method for creating a universal bus.
Figure 12B:
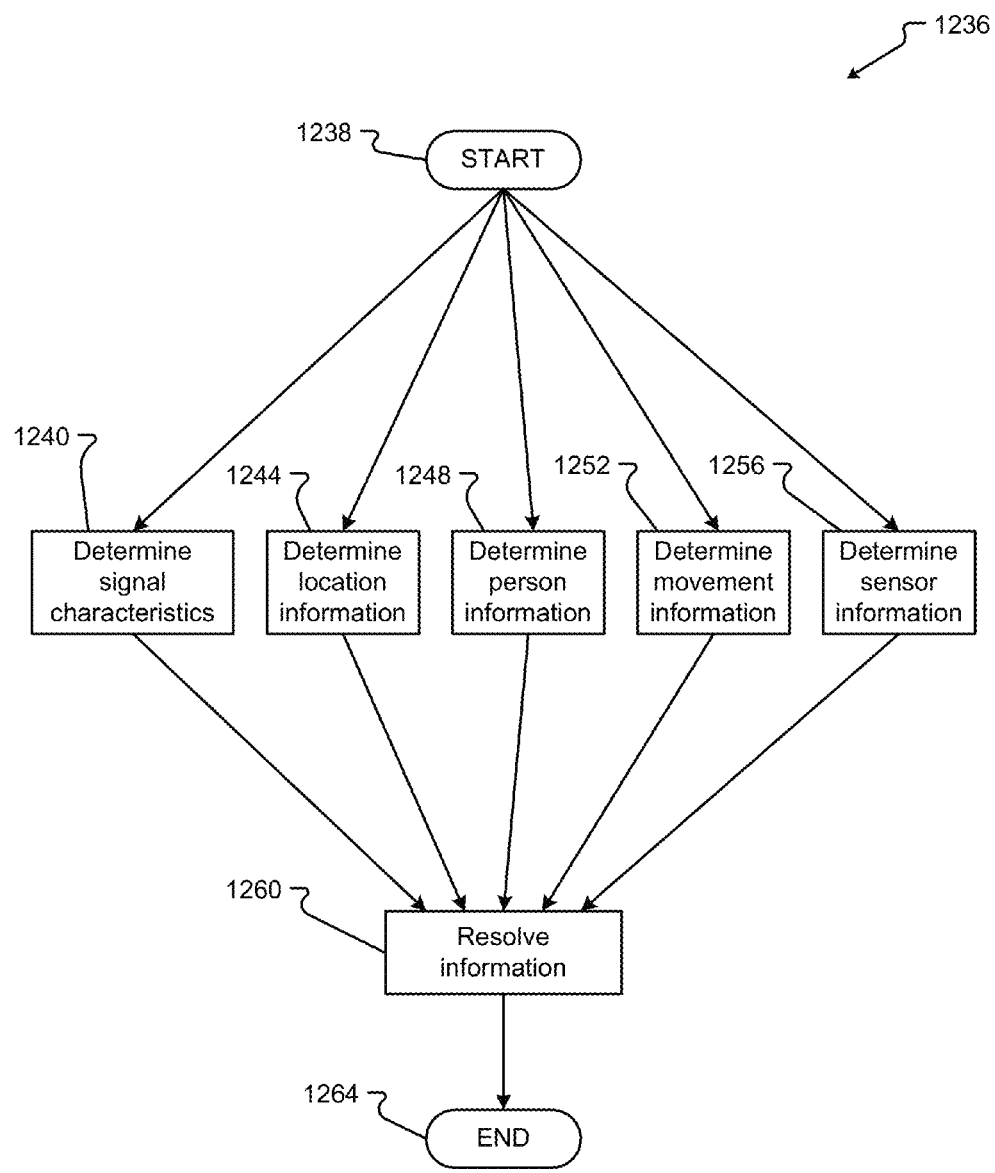
FIG. 12B is a flow diagram of a method for determining a signal originates inside a vehicle.

An embodiment of a method 1200/1236 for creating a universal bus for the vehicle system is shown in FIGS. 12A and 12B. While a general order for the steps of the method 1200 is shown in FIGS. 12A and 12B. Generally, the method 1200/1236 starts with a start operation 1204/1238 and ends with an end operation 1232/1264. The method 1200/1236 can include more or fewer steps or can arrange the order of the steps differently than those shown in FIGS. 12A and 12B. The method 1200/1236 can be executed as a set of computer-executable instructions executed by a computer system and encoded or stored on a computer readable medium. Hereinafter, the method 1200/1236 shall be explained with reference to the systems, components, modules, software, data structures, user interfaces, etc. described in conjunction with FIGS. 1-11.

The communication system 1028 may receive a signal from a device, in step 1208. The signal can be received by one of the receivers 904, which may include a BLUETOOTH™ transceiver 1004, an 802.11 transceiver 1012, or some other receiver. The signal may then be transferred to the communications system 1028.

In step 1212, the communication system 1028 may determine if the signal originated from inside the vehicle. Various analyses may be performed on the signal or on signal information contained in the signal. Some of this analysis may be as described in conjunction with FIG. 12B. If the signal is determined to originate outside the vehicle, the method 1200 may proceed NO to step 1216 where the communications system 1028 can reject the receipt of the signal. If the signal is determined to have originated from inside the vehicle, the method 1200 can proceed YES to step 1220, where the communication system 1028 may make a connection to the device 1008.

The communication system 1028, in step 1220, can provide an Internet Protocol (IP) address or other type of access such that signals coming from the device 1008 thereinafter are not rejected. Other types of wireless or wired connections may also be made. If the connection is with a BLUETOOTH™ capable device 1008, the communication system 1028 can pair the device 1008 with a BLUETOOTH™ transceiver 1004, in step 1224. The communication system 1028 may make several pairings as there may be two or more BLUETOOTH™ transceivers 1008 available. Upon making the connection or pairing, the communication system 1028 can provide access to the communication bus 1228, such that signals to and from devices 1008 are relayed to the processor 504 of the vehicle control system 204, which may be accessed by the device 1008 sending the signals. In this way, a communication bus is established through wireless or wired connections.

Embodiment of analysis used to determine whether a signal originates inside a vehicle is shown in FIG. 12B. The signal processor 1108 of the communication system 1028 may analyze signal characteristics, in step 1240. Signal characteristics can include one or more of, but is not limited to analyzing signal attenuation, where a signal with a shrinking strength or increasing strength may be determined to be moving in relative proximity or position to the vehicle 104, analyzing any Doppler shift in the frequency, which may indicate movement in reference to the vehicle 104, analyzing any kind of delay between receiving the same signal at the various transceivers 904A through 904D. A difference in the time of receipt can be used to triangulate where the location of the signal originated and if that location is outside the vehicle or inside the vehicle.

The signal processor 1108 can also analyze location information, in step 1244. Beyond the signal characteristics, the signal processor 1108 may receive information from sensors 242 to determine a location of the vehicle 104. If the location of the vehicle 104 is in an area where there is not a likelihood of signal congestion, for example, in the driveway of someone's home, then all received signals may be determined to have been with inside the vehicle. Thus, as signals are received and if the location has changed, the signal processor 1108 may determine whether the current location is an area where there may be more signals received that would be outside the vehicle or whether the signals received has changed.

Analysis of the person sending the signal may also be used, in step 1248. Thus, the signal processor 1108 may access signal data 1116 to determine if the signals have been received from this device or from this person before. Thus, the signal may identify a person documented in the signal data 1116, and the signal processor 1108 may determine if that person has used or connected with the signal processor 1108 previously. Further, the signal processor 1108 can determine if there is movement of the vehicle, in step 1252. If a signal remains within the car after the vehicle 104 moves, then that signal can be determined to be inside the vehicle 104. For example, if the signal is received at the beginning of a route and then at some time thereinafter the signal continues to be received, then it is determined that signal may be inside the vehicle 104.

Further, sensor data may be analyzed, in step 1256. Sensor data may include such things as determining if there are people and the number of people within a car. Thus, if there are three people in the vehicle 104 and three signals are received, all three signals may be determined to be inside the vehicle. Further, it may be possible for the sensors 242 to determine if a device is currently being used inside the vehicle. For example, if an optical sensor can view a device 1008 within its field of vision and/or if an electromagnetic field sensor determines that there is EMF radiation emanating from a location in the vehicle 104, then the signal processor 1108 can determine that that signal is originating inside a vehicle 104.

The signal processor 1108 may receive one or more of these analyses and resolve the information, in step 1260. Thus, the signal processor 1108 can cross-correlate information from different analyses to determine if the signal is within the vehicle 104. Different weight may be given to different analyzes to make a determination about where the signal originates. In this way, a more robust decision is made as to whether or not the signal originates in the vehicle 104 and should be allowed to connect to the universal bus or the routing system of the vehicle 104.

Figure 13:
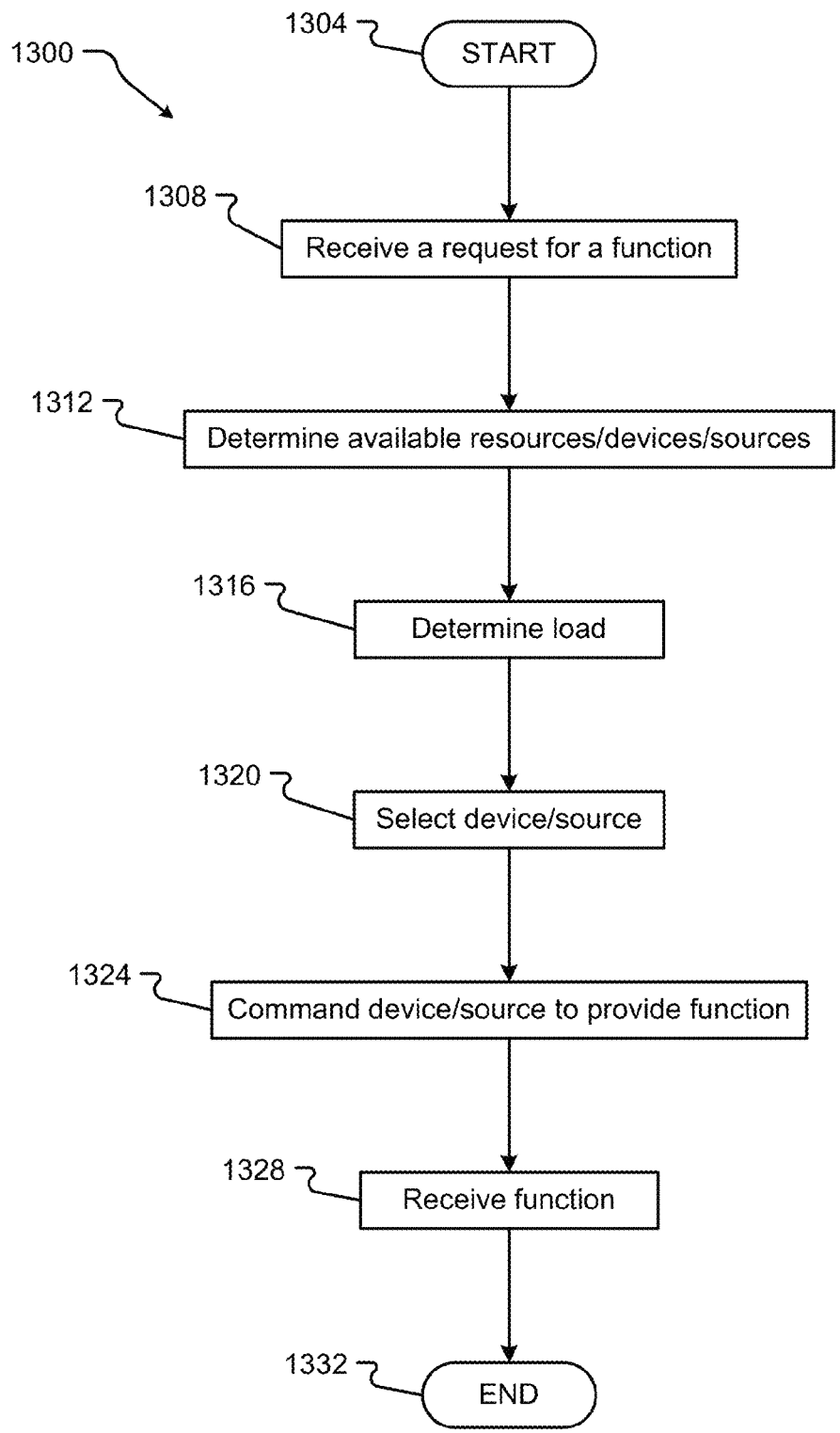
FIG. 13 is a flow diagram of a method for providing a network hot spot.

An embodiment of a method 1300 for providing a hot spot in the vehicle 104 may be as provided in FIG. 13. While a general order for the steps of the method 1300 is shown in FIG. 13. Generally, the method 1300 starts with a start operation 1304 and ends with an end operation 1332. The method 1300 can include more or fewer steps or can arrange the order of the steps differently than those shown in FIG. 13. The method 1300 can be executed as a set of computer-executable instructions executed by a computer system and encoded or stored on a computer readable medium. Hereinafter, the method 1300 shall be explained with reference to the systems, components, modules, software, data structures, user interfaces, etc. described in conjunction with FIGS. 1-12.

A user using a device 1008 may request a function, instead of 1308. The function can be any type of feature or application that may be offered by the vehicle 104, for example, the playing of multimedia data, provision of access to the internet, e-mail, or other types of functions. The request may be received by the communication system 1028 and processed by the signal processor 1108.

The signal processor 1108 may then determine the available devices or sources for the function, in step 1312. The signal processor 1108 can determine if one of the devices 1008 already connected within the communication system 1028 can provide the function. For example, if the function is the provision of a multimedia stream, one of the devices 1008 within the vehicle 104 may be able to connect to a source to provide the multimedia stream. The device 1008 can be a computing system with a processor and memory. As such, the signal processor 1108 may determine to use what available resources there are to provide the function to the requestor.

The signal processor 1108 may also determine the load on each of the devices, in step 1316. Thus, not only will the signal processor 1108 look for an available source, the signal processor 1108 can also look for a source that has the least amount of load. The load balancing may be determined by the number of input/output messages sent between a source or device 1008 and the signal processor 1108, may be determined by information sent to the signal processor 1108, or may be determined by some other means.

Based on the available sources and the load, the signal processor 1108 can determine a device 1108 or source to select to provide for the function, in step 1320. Upon selecting the device 1108 or source, the signal processor 1108 can send a command or directive to the device 1108 or source, in step 1324, to provide the function. The device 1108 or source may then provide the function, and the requesting device 1108 may receive that function, in step 1328.

Figure 14:
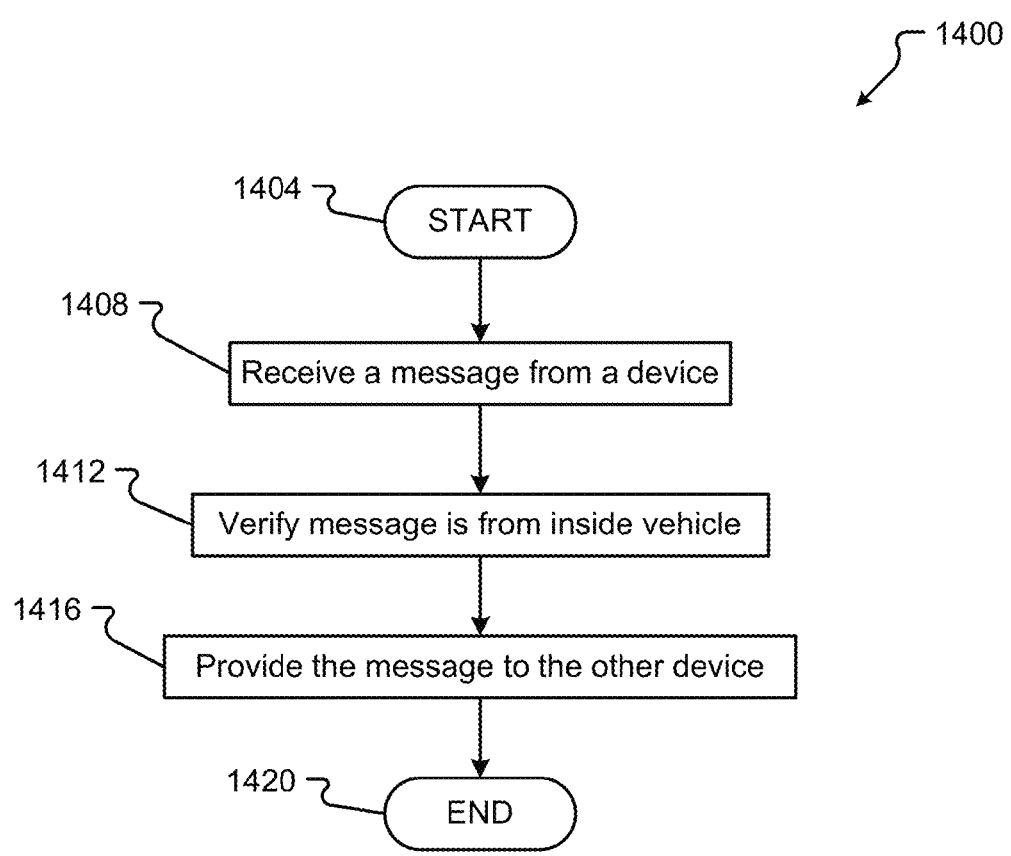
FIG. 14 is a flow diagram of a method for communicating between devices.

An embodiment of method 1400 for communication between devices inside a vehicle 104 is shown in FIG. 14. While a general order for the steps of the method 1400 is shown in FIG. 14. Generally, the method 1400 starts with a start operation 1404 and ends with an end operation 1420. The method 1400 can include more or fewer steps or can arrange the order of the steps differently than those shown in FIG. 14. The method 1400 can be executed as a set of computer-executable instructions executed by a computer system and encoded or stored on a computer readable medium. Hereinafter, the method 1400 shall be explained with reference to the systems, components, modules, software, data structures, user interfaces, etc. described in conjunction with FIGS. 1-13.

A communication system 1028 may receive a message from a device 1008, in step 1408. This message may be directed to another device 1008 within the vehicle 104. Thus, the communication system 1028 may access signal data 1116 or address information from an address module 1112 to determine an address or location for the receiving device 1008. This information may be used to verify that the message is from a device inside the vehicle 104, in step 1412. Thus, the address or other information from the sender may be compared to signal data 1116 and used to verify the message is authentic. If the message is verified, the communication system 1028 may provide the message to the recipient address, in step 1416. Using the communication system 1028 devices 1008 can communicate without communicating directly between each other or through some other communication network. The devices 1008 within the vehicle 104 may use the communication system 1028 to relay message between each other. In this way, the universal bus for the devices 1008 is used as a more efficient communication system 1100 that is more secure and contained within the vehicle 104.

Figure 15:
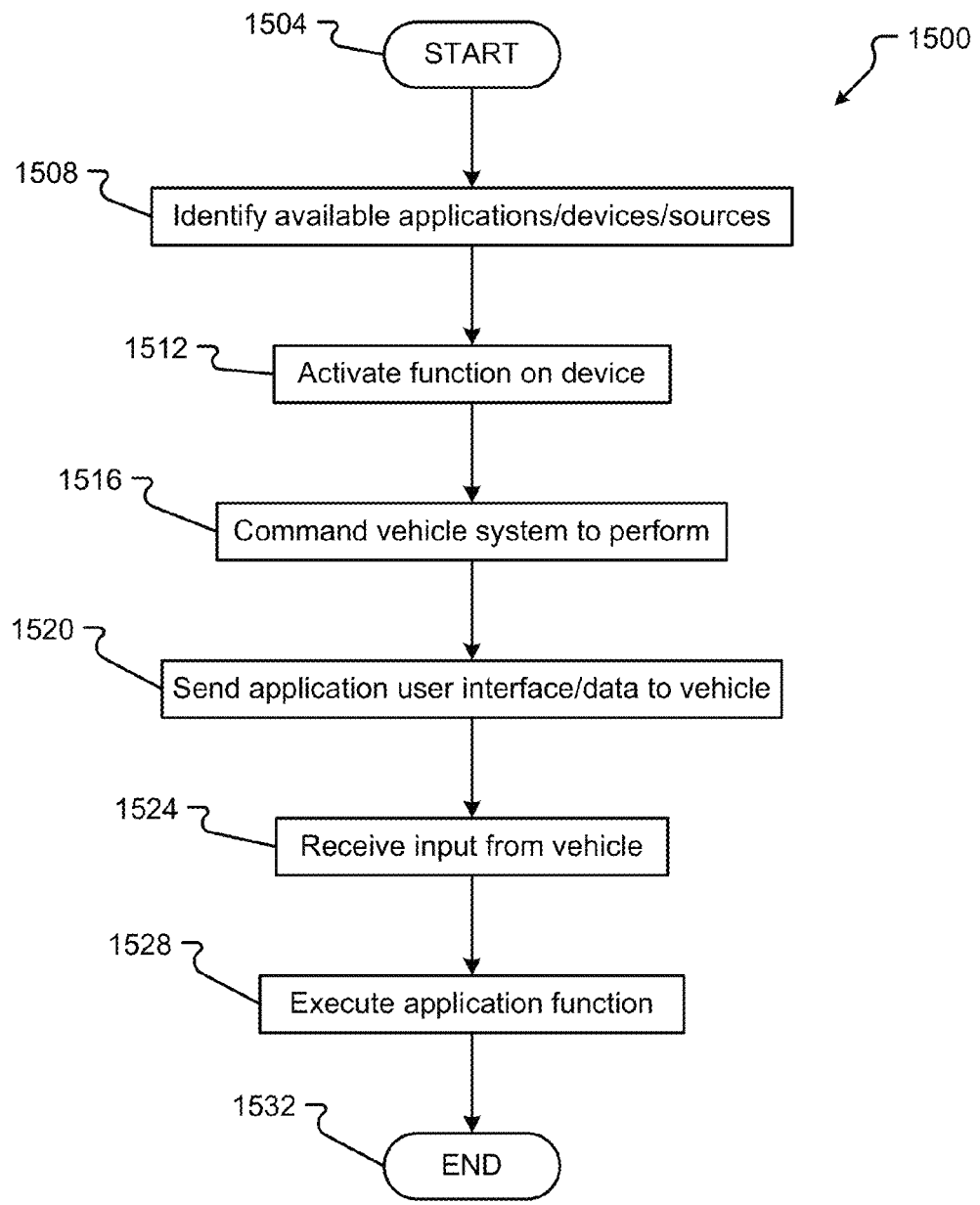
FIG. 15 is a flow diagram of a method for sharing an application from a device.

An embodiment of a method 1500 for sharing an application between a device 1008 and the vehicle system 200 may be as shown in FIG. 15. While a general order for the steps of the method 1500 is shown in FIG. 15. Generally, the method 1500 starts with a start operation 1504 and ends with an end operation 1532. The method 1500 can include more or fewer steps or can arrange the order of the steps differently than those shown in FIG. 15. The method 1500 can be executed as a set of computer-executable instructions executed by a computer system and encoded or stored on a computer readable medium. Hereinafter, the method 1500 shall be explained with reference to the systems, components, modules, software, data structures, user interfaces, etc. described in conjunction with FIGS. 1-14.

The processor 504 may identify available application sources or devices 1008, in step 1508. The available application sources or devices 1008 may be determined by sending requests through the communication system 1028 to devices 1008/sources. The response may be provided back to the processor 504, which may then identify those applications, sources, and/or devices 1008 to a user's touch sensitive display 568. An interaction with the touch sensitive display 568 may then activate the function in an application, in step 1512. Thus, the processor 504 can receive the selection of a function or application in the touch sensitive display 568. Based on this selection, the processor 504 may determine which function was activated based on what was displayed in the touch sensitive display 568.

The processor 504 may then send that selection to a device 1008. Upon receiving the selection, the device 1008 may then execute the application or function and command the vehicle system 200 to perform the display of information based on the function, in step 1516. Thus, the processing of the function or application occurs in the device 1008 but is displayed in the touch sensitive display 568. The device 1008 sends application user interface information or data to the vehicle system 504, in step 1520. This information may be displayed in the touch sensitive display 568.

The processor 504 may thereinafter receive an input from the device 1008, in step 1524. Any command or information sent to the processor 504 may then be executed as an application function on the device 1008 but displayed on the touch sensitive display 568 or other display within the vehicle 104, in step 1528. In this way, the device 1008 actually executes the application while the vehicle 104 displays the user interface information. The execution of the application appears to occur in the vehicle system 200, but the processing does not actually occur in the vehicle processor 504.

Figure 16:
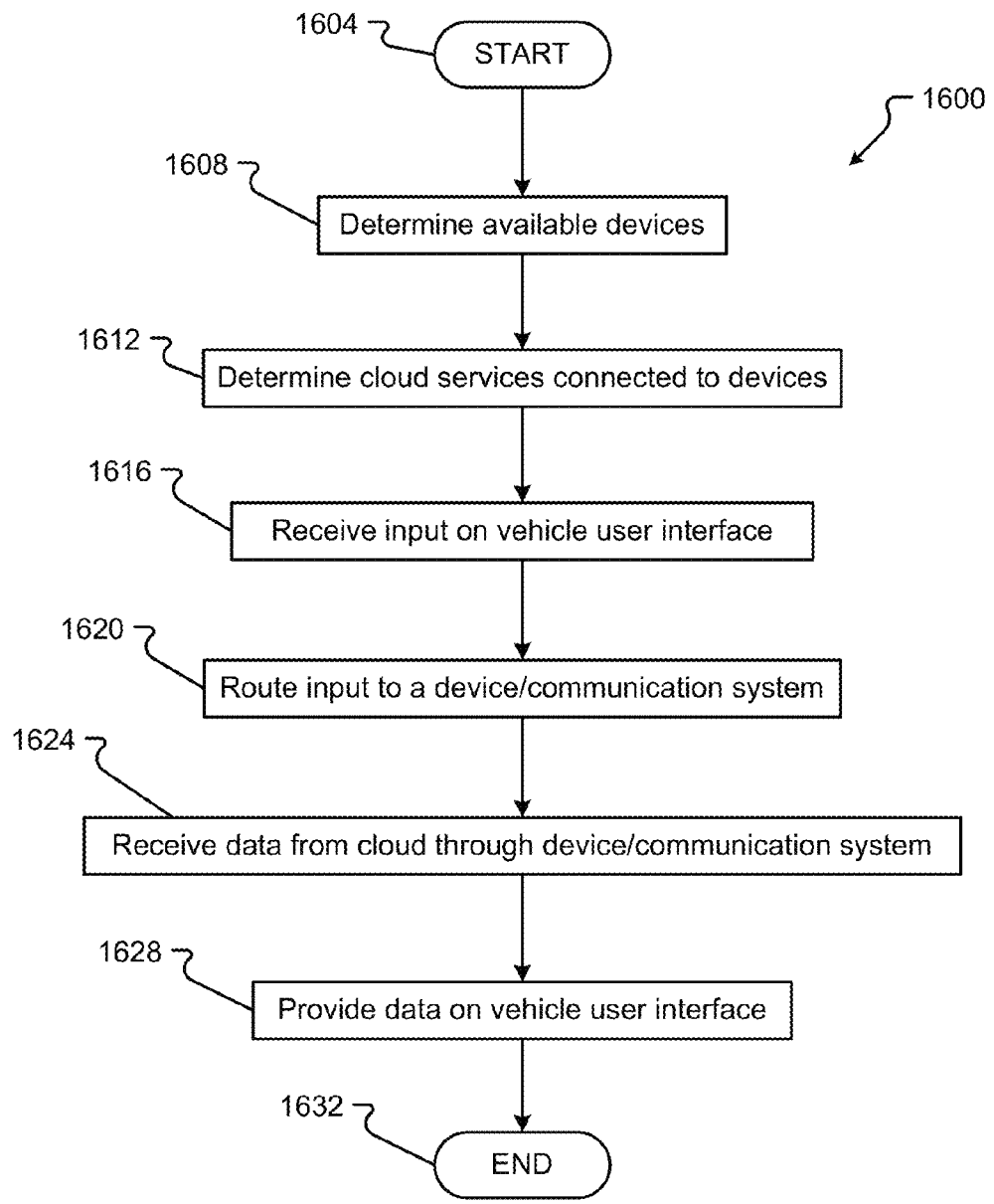
FIG. 16 is a flow diagram of a method for managing data stored in the cloud.

An embodiment of a method 1600 for providing data or functions through cloud-based storage or applications is shown in FIG. 16. While a general order for the steps of the method 1600 is shown in FIG. 16. Generally, the method 1600 starts with a start operation 1604 and ends with an end operation 1632. The method 1600 can include more or fewer steps or can arrange the order of the steps differently than those shown in FIG. 16. The method 1600 can be executed as a set of computer-executable instructions executed by a computer system and encoded or stored on a computer readable medium. Hereinafter, the method 1600 shall be explained with reference to the systems, components, modules, software, data structures, user interfaces, etc. described in conjunction with FIGS. 1-15.

A processor 504 can determine the devices 1008 connected to the communication system 1028, in step 1608. Here, the communication system 1028 may send information to the processor 508 from signal data 1116. The signal data 1116 may be sent to the processor 504 from signal processor 1108 and available resources, available devices, and available sources. The processor 504 may also determine cloud sources for applications or data, in step 1612. The signal processor 1108 may determine connections from the devices 1008 to cloud sources. The connection information may then be sent from the signal processor 1108 to the processor 504. Further, the processor 504 may determine what cloud sources are available through server 228. The cloud source information may then be presented in a user interface in the touch sensitive display 568.

From this touch sensitive display 568, the processor 504 can receive an input on the vehicle user interface, in step 1616. The input may be a selection of a cloud source for an application or for data. The selection may be analyzed to determine the correct source for that cloud information. Thus, the processor 504 may send a command to the signal processor 1108 to route the input to the appropriate device 1008 or to the server 228 that can provide that cloud application/data, in 1620. The processor 504 can leverage the access of other devices 1008 to obtain cloud data. The cloud source may be provided from two or more different devices 1008 or from a device 1008 and the server 228. In this way, one of the devices 1008 or the server 228 may be selected based on load-balancing principles.

The data may be received through the device 1008 or the server 228 from the cloud and can be provided to the signal processor 1108, in step 1624. The information may be received from two or more sources and one source cached so that seamless transition between the sources may occur should one of the sources become unavailable unexpectedly. The data received from the cloud source may then be provided to the vehicle touch sensitive display 568, in 1628. In this way, cloud sources may be leveraged by the vehicle 104, although the access to those cloud sources may be from device 1008.

Figure 17:
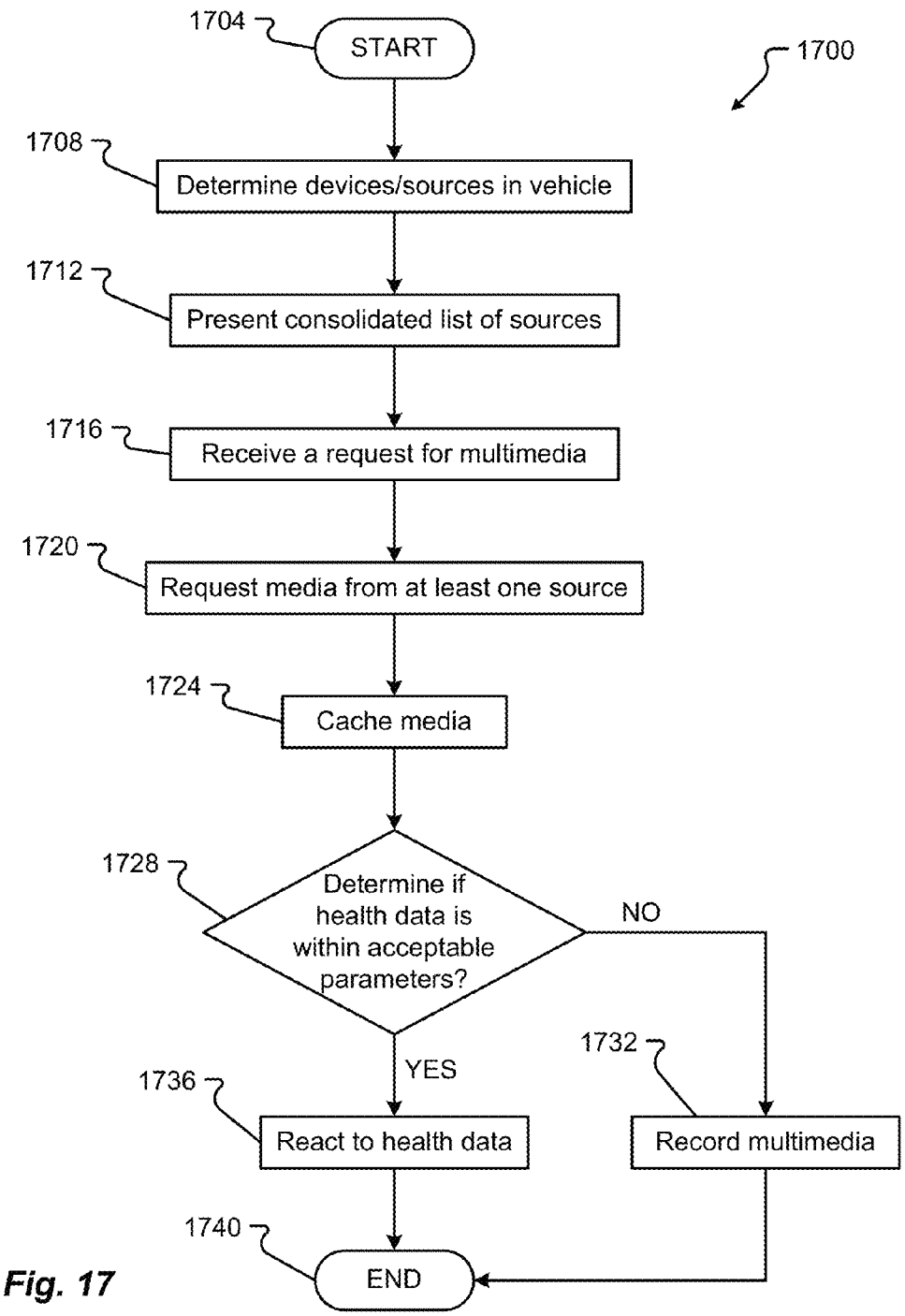
FIG. 17 is a flow diagram of a method for streaming media in a vehicle.

A method 1700 for streaming multimedia data is shown in FIG. 17. While a general order for the steps of the method 1700 is shown in FIG. 17. Generally, the method 1700 starts with a start operation 1704 and ends with an end operation 1740. The method 1700 can include more or fewer steps or can arrange the order of the steps differently than those shown in FIG. 17. The method 1700 can be executed as a set of computer-executable instructions executed by a computer system and encoded or stored on a computer readable medium. Hereinafter, the method 1700 shall be explained with reference to the systems, components, modules, software, data structures, user interfaces, etc. described in conjunction with FIGS. 1-16.

A signal processor 1108 can determine devices or sources for multimedia data, in step 1708. The determination may be made by canvassing (e.g., polling each source for what multimedia the source can provide) the different devices 1008 or the server 228 for information about multimedia data. The received information may be consolidated and presented on the vehicle touch sensitive display 568, in step 1712. Thus, the user may select from multimedia data in its consolidated form from the user interface 568.

The user may select from the vehicle user interface 568 a request for multimedia, in step 1760. The user touch sensitive display 568 can receive the request and send the request to the processor 504. The processor 504 can determine the source for the multimedia selected and request that media from that source, in step 1720. In embodiments the processor 504 may request the multimedia from two or more sources. The request can be sent from the processor 504 to the signal processor 1108. There, the signal processor 1108 can send the request to the device 1008 or to the server 224.

The multimedia received from the source may be cached, in step 1724. If multimedia is being perceived from two or more sources each source may be cached. One of the sources may be used to present the multimedia data to the user while the other stream of data remains cached. In this way, a failsafe or fail-over may be provided should one of the sources no longer provide data or some malfunction may occur.

The processor may then determine if safety parameters are met, in step 1728. The provision of certain types of multimedia data, for example video data, may not be allowed during certain vehicle operations or to certain passengers within the vehicle 104. For example, a driver cannot watch a movie while driving. Thus, the processor 504 can determine if the safety parameters for the particular person desiring the multimedia data are met.

If those safety parameters are not met, the method 1700 proceeds NO to step 1732. In step 1732, the processor 504 may record the data to local storage. Thus, the data may be provided at a later time from this local storage. Likewise, the processor 504 can send a signal to another data storage element that can record the data. Thus, the processor 504 can coordinate the recording of the data for the user in a different source that allows the user to view it after they are done operating the vehicle 104.

If the safety parameters are met, the method 1700 proceeds YES to step 1736. Here, the data may then be presented in the vehicle 104 to a user interface 568. This user interface 568 may provide video data, internet data, audio data, or other types of data. The presentation of the data may happen in one or more locations within the vehicle 104 and one or more user interfaces.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a tablet-like device, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The embodiments can include a method, comprising receiving a signal at a vehicle communication system from a device; automatically determining if the signal originates from inside the vehicle; if the signal does not originate from inside the vehicle, rejecting the signal; if the signal originates from inside the vehicle, communicatively connecting the vehicle communication system to the device; and providing access to a vehicle bus.

The vehicle communication system can include a communication system in communication with two or more transceivers, wherein two or more of the transceivers are BLUETOOTH transceivers, and wherein two or more antennas for the vehicle communication system are separated but positioned within the vehicle.

The communication system can analyze the signal. The analysis includes one or more of: determining signal characteristics; determining location information; determining person information; determining movement information; and determining sensor information. The communication system may resolve the analysis to determine if the signal originated inside the vehicle, wherein the analysis may be weighted to resolve the determination of if the signal originated inside the vehicle. The vehicle communication system can include at least one wireless LAN component, wherein the vehicle communication system includes at least one wireless LAN component, and wherein the device communicates with the at least one wireless LAN component.

The embodiments can also include a vehicle communication system, comprising: two or more BLUETOOTH transceivers; a communication system comprising: two or more communication modules; a signal processor; wherein the signal processor is operable to: receive a signal at the vehicle communication system from a device; automatically determine if the signal originates from inside the vehicle; if the signal does not originate from inside the vehicle, reject the signal; if the signal originates from inside the vehicle, communicatively connect the vehicle communication system to the device; and provide access to a vehicle bus.

The vehicle communication system can include at least one wireless LAN component, and wherein at least one device connects through the wireless LAN component, wherein the communication system further comprises a signal data database and/or a translator. The signal processor may be further operable to: determine signal characteristics; determine location information; determine person information; determine movement information; determine sensor information; and resolve the signal characteristics, location information, person information, movement information, and sensor information to determine if the signal originated inside the vehicle.

The embodiments can also include computer-executable instructions comprising: instructions to receive a signal at a vehicle communication system from a device; instructions to automatically determine if the signal originates from inside the vehicle; if the signal does not originate from inside the vehicle, instructions to reject the signal; if the signal originates from inside the vehicle, instructions to communicatively connect the vehicle communication system to the device; and instructions to provide access to a vehicle bus.

The vehicle communication system can includes: at least one wireless LAN component, and wherein at least one device connects through the wireless LAN component; two or more BLUETOOTH transceivers; a communication system comprising: two or more communication modules; a signal processor; a signal data database; and a translator.

The signal processor can execute instructions to: determine signal characteristics; determine location information; determine person information; determine movement information; determine sensor information; and resolve the signal characteristics, location information, person information, movement information, and sensor information to determine if the signal originated inside the vehicle, wherein the signal characteristics, location information, person information, movement information, and sensor information is weighted to resolve the determination of if the signal originated inside the vehicle.

The embodiments can also include a method, comprising: receiving a signal at a vehicle communication system from a device; automatically determining if the signal originates from inside the vehicle; if the signal does not originate from inside the vehicle, rejecting the signal; if the signal originates from inside the vehicle, communicatively connecting the vehicle communication system to the device; receiving a request for a function; determining one or more of available resources, available devices, and available sources; determining load; selecting a device or source to provide the function; commanding the device or source to provide the function; and receiving the function.

The vehicle communication system can include a communication system in communication with one or more devices, wherein the device is a computing system. The function may be one of playing of multimedia data, provisioning of access to the internet, or providing access to e-mail. Determining the load may comprise one of: determining a number of input/output messages sent between a device and vehicle communication system; or analyzing information sent to the vehicle communication system by the device, wherein the selection of the device or source is based both on availability and load. A first device may request the function and a second device provides the function. A vehicle communication system can the request the function and a device provides the function for the vehicle communication system. A device may request the function, and the vehicle communication system provides the function for the device.

The embodiments can also include a vehicle communication system, comprising: two or more BLUETOOTH transceivers; a communication system comprising: two or more communication modules; a signal processor; wherein the signal processor is operable to: receive a request for a function; determine one or more of available resources, available devices, and available sources; determine load on the one or more available resources, available devices, and available sources; select a device or source to provide the function; command the device or source to provide the function; and receive the function, wherein the function is one of playing of multimedia data, provisioning of access to the internet, or providing access to e-mail.

The embodiments can also include computer-executable instructions comprising: instructions to receive a request for a function; instructions to determine one or more of available resources, available devices, and available sources; instructions to determine load on the one or more available resources, available devices, and available sources; instructions to select a device or source to provide the function; instructions to command the device or source to provide the function; and instructions to receive the function. The vehicle communication system can includes at least one wireless LAN component, and wherein at least one device connects through the wireless LAN component; two or more BLUETOOTH transceivers; a communication system comprising: two or more communication modules; a signal processor; a signal data database; and a translator. The instructions to determine the load comprises one of: instructions to determine a number of input/output messages sent between a device and vehicle communication system; or instructions to analyze information sent to the vehicle communication system by the device, wherein the selection of the device or source is based both on availability and load.

The embodiments can also include a method, comprising: receiving a signal at a vehicle communication system from a device; automatically determining if the signal originates from inside the vehicle; if the signal does not originate from inside the vehicle, rejecting the signal; if the signal originates from inside the vehicle, communicatively connecting the vehicle communication system to the device; receiving a message from a first device; verifying that the message originated from inside the vehicle; and providing the message to a second device. The message may be is directed to the second device. The method may also comprise: accessing signal data in a signal data database to retrieve address information from the second device; accessing signal data in a signal data database to retrieve address information for the first device; comparing an address for the first device in the message with the retrieved address information, wherein if the address for the first device in the message is the same as the retrieved address information, the message is verified.

The message may be sent through the vehicle communication system to the second device. Verifying the message can comprise: determining signal characteristics; determining location information; determining person information; determining movement information; determining sensor information; and resolving the signal characteristics, location information, person information, movement information, and sensor information to determine if the message originated inside the vehicle. The vehicle communication system can include at least one wireless LAN component, wherein the first device communicates to the second device through the at least one wireless LAN component.

The embodiments can also include a vehicle communication system, comprising: two or more BLUETOOTH transceivers; a communication system comprising: two or more communication modules; a signal processor; wherein the signal processor is operable to: receiving a message from a first device; verifying that the message originated from inside the vehicle; and providing the message to a second device, wherein the message is directed to the second device. The vehicle communication system can access signal data in a signal data database to retrieve address information from the second device, and access signal data in a signal data database to retrieve address information for the first device. The vehicle communication system can also compare an address for the first device in the message with the retrieved address information, wherein if the address for the first device in the message is the same as the retrieved address information, the message is verified, wherein the message is sent through the vehicle communication system to the second device.

The embodiments can also include computer-executable instructions comprising: instructions to receive a message from a first device; instructions to verify that the message originated from inside the vehicle; and instructions to provide the message to a second device.

The vehicle communication system can include at least one wireless LAN component, and wherein at least one device connects through the wireless LAN component; two or more BLUETOOTH transceivers; a communication system comprising: two or more communication modules; a signal processor, wherein the communication system further comprises: a signal data database; and a translator. The instructions can also include instructions to access signal data in a signal data database to retrieve address information from the second device, instructions to access signal data in a signal data database to retrieve address information for the first device; and instructions to compare an address for the first device in the message with the retrieved address information, wherein if the address for the first device in the message is the same as the retrieved address information, the message is verified, wherein the vehicle communication system includes at least one wireless LAN component, and wherein the first device communicates to the second device through the at least one wireless LAN component.

The embodiments can also include a method, comprising: receiving a signal at a vehicle communication system from a device; automatically determining if the signal originates from inside the vehicle; if the signal does not originate from inside the vehicle, rejecting the signal; if the signal originates from inside the vehicle, communicatively connecting the vehicle communication system to the device; receiving a request for a application; determining one or more of available resources, available devices, and available sources; determining load; activating function on a device or source to execute the application; receiving, from the device, application user interface information or data at the vehicle to be displayed on a display associated with the vehicle; displaying the application on the display; commanding the vehicle communication system to perform functions for the application; receiving input on the display; based on the input received on the display, executing an application function on the device, wherein the vehicle communication system includes a communication system in communication with one or more devices.

The device is a computing system, and wherein determining the load comprises one of: determining a number of input/output messages sent between a device and vehicle communication system; or analyzing information sent to the vehicle communication system by the device, wherein the selection of the device or source is based both on availability and load. The request for the application may be received by the vehicle communication system, wherein a device provides the application for the vehicle communication system.

The embodiments can also include a vehicle communication system, comprising: two or more BLUETOOTH transceivers; a communication system comprising: two or more communication modules; a signal processor; wherein the signal processor is operable to: receive a request for a application; determine one or more of available resources, available devices, and available sources; determine load; activate function on a device or source to execute the application; receive, from the device, application user interface information or data at the vehicle to be displayed on a display associated with the vehicle; and display the application on the display, wherein the signal processor is further operable to receive a command for the vehicle communication system to perform functions for the application, receive input on the display; and based on the input received on the display, execute an application function on the device, wherein determining the load comprises one of: determining a number of input/output messages sent between a device and vehicle communication system; or analyzing information sent to the vehicle communication system by the device. The request for the application may be received by the vehicle communication system, and a device provides the application for the vehicle communication system.

The embodiments can also include computer-executable instructions comprising: instructions to receive a request for a application; instructions to determine one or more of available resources, available devices, and available sources; instructions to determine load; instructions to activate function on a device or source to execute the application; instructions to receive, from the device, application user interface information or data at the vehicle to be displayed on a display associated with the vehicle; and instructions to display the application on the display, wherein the vehicle communication system includes: at least one wireless LAN component, and wherein at least one device connects through the wireless LAN component; two or more BLUETOOTH transceivers; a communication system comprising: two or more communication modules; a signal processor. The communication system can further comprise: a signal data database; and a translator. The instructions can further comprise: instructions to receive an input on the display; and based on the input received on the display, instructions to execute an application function on the device, wherein the request for the application is received by the vehicle communication system, and wherein a device provides the application for the vehicle communication system.

The embodiments can also include a method, comprising: receiving a signal at a vehicle communication system from a device; automatically determining if the signal originates from inside the vehicle; if the signal does not originate from inside the vehicle, rejecting the signal; if the signal originates from inside the vehicle, communicatively connecting the vehicle communication system to the device; determining one or more of available resources, available devices, and available sources; determining cloud services connected to the available resources, available devices, and available sources; receiving input on a user interface of the vehicle, wherein the input requests a cloud service; routing the input to a device; receiving, from the device, data from the cloud service; and providing the data on the display of the vehicle.

A vehicle communication system can send signal data to a processor to determine the available resources, available devices, and available sources and the cloud services and determine which cloud sources are available through the device, wherein the processor determines which cloud sources are available through a server. The processor may also present the cloud services information on a touch sensitive display, wherein the device is a computing system, and wherein the cloud service is for the provision of data or for the execution of an application. The input can be received on the touch sensitive display, wherein the input is analyzed to determine a correct source for the cloud service, and wherein, based on the analysis, the vehicle communication system routes the input to the correct device.

The embodiments can also include a vehicle communication system, comprising: two or more BLUETOOTH transceivers; a communication system comprising: two or more communication modules; a signal processor; wherein the signal processor is operable to: determine one or more of available resources, available devices, and available sources; determine cloud services connected to the available resources, available devices, and available sources; receive input on a user interface of the vehicle, wherein the input requests a cloud service; route the input to a device; receive, from the device, data from the cloud service; and provide the data on the display of the vehicle, wherein the signal processor determines which cloud sources are available through the device, and wherein a processor determines which cloud sources are available through a server. The processor can be further operable to present the cloud services information on a touch sensitive display, wherein the input is received on the touch sensitive display, wherein the input is analyzed to determine a correct source for the cloud service, and wherein, based on the analysis, the signal processor routes the input to the correct device, and wherein the cloud service is for the provision of data or for the execution of an application.

The embodiments can also include computer-executable instructions comprising: instructions to determine one or more of available resources, available devices, and available sources; instructions to determine cloud services connected to the available resources, available devices, and available sources; instructions to receive input on a user interface of the vehicle, wherein the input requests a cloud service; instructions to route the input to a device; instructions to receive, from the device, data from the cloud service; and instructions to provide the data on the display of the vehicle, wherein the vehicle communication system includes: at least one wireless LAN component, and wherein at least one device connects through the wireless LAN component; two or more BLUETOOTH transceivers; a communication system comprising: two or more communication modules; a signal processor, and wherein the communication system further comprises: a signal data database; and a translator.

The signal processor can determine which cloud sources are available through the device, and wherein a processor determines which cloud sources are available through a server, wherein the cloud service is for the provision of data or for the execution of an application.

The embodiments can also include a method, comprising: receiving a signal at a vehicle communication system from a device; automatically determining if the signal originates from inside the vehicle; if the signal does not originate from inside the vehicle, rejecting the signal; if the signal originates from inside the vehicle, communicatively connecting the vehicle communication system to the device; determining one or more of available resources, available devices, and available sources; determining multimedia sources associated with the available resources, available devices, and available sources; receiving input on a user interface of the vehicle, wherein the input multimedia; routing the input to an available resource, available device, and available source; receiving a multimedia steam from an available resource, available device, and available source; and presenting the multimedia stream on an output of the vehicle.

The method can further comprise caching the multimedia stream, wherein two or more multimedia streams are received from two or more sources, and wherein all of the two or more multimedia streams are cached. Determining multimedia sources associated with the available resources, available devices, and available sources can comprise canvassing the available resources, available devices, and available sources for multimedia available at those available resources, available devices, and available sources. The method can further comprise consolidating the multimedia; and presenting the multimedia on a vehicle touch sensitive display; determining if safety parameters are met for presentation of the multimedia stream; if safety parameters are met for presentation of the multimedia stream, presenting the multimedia stream; if safety parameters are not met for presentation of the multimedia stream, recording the multimedia stream, wherein the multimedia stream is recorded in local storage.

The embodiments can also include a vehicle communication system, comprising: two or more BLUETOOTH transceivers; a communication system comprising: two or more communication modules; a signal processor; wherein the signal processor is operable to: determine one or more of available resources, available devices, and available sources; determine multimedia sources associated with the available resources, available devices, and available sources; receive input on a user interface of the vehicle, wherein the input multimedia; route the input to an available resource, available device, and available source; receive a multimedia steam from an available resource, available device, and available source; and present the multimedia stream on an output of the vehicle, wherein two or more multimedia streams are received from two or more sources, and wherein all of the two or more multimedia streams are cached.

The processor can be further operable to: consolidate the multimedia; present the multimedia on a vehicle touch sensitive display; determine if safety parameters are met for presentation of the multimedia stream; if safety parameters are met for presentation of the multimedia stream, present the multimedia stream; and if safety parameters are not met for presentation of the multimedia stream, record the multimedia stream, wherein the multimedia stream is recorded in local storage in the vehicle or on another storage element not associated with the vehicle.

The embodiments can also include computer-executable instructions comprising: instructions to determine one or more of available resources, available devices, and available sources; instructions to determine multimedia sources associated with the available resources, available devices, and available sources; instructions to receive input on a user interface of the vehicle, wherein the input multimedia; instructions to route the input to an available resource, available device, and available source; instructions to receive a multimedia steam from an available resource, available device, and available source; and instructions to present the multimedia stream on an output of the vehicle, wherein the vehicle communication system includes: at least one wireless LAN component, and wherein at least one device connects through the wireless LAN component; two or more BLUETOOTH transceivers; a communication system comprising: two or more communication modules; a signal processor, wherein the communication system further comprises: a signal data database; and a translator.

The computer executable instructions can further comprise instructions to determine if safety parameters are met for presentation of the multimedia stream; if safety parameters are met for presentation of the multimedia stream, instructions to present the multimedia stream; and if safety parameters are not met for presentation of the multimedia stream, instructions to record the multimedia stream, wherein the multimedia stream is recorded in local storage in the vehicle or on another storage element not associated with the vehicle.

What is claimed is:

1. A method, comprising:
receiving a signal at a vehicle communication system from a device;
automatically determining if the signal originates from inside the vehicle;
if the signal does not originate from inside the vehicle, rejecting the signal;
if the signal originates from inside the vehicle, communicatively connecting the vehicle communication system to the device;
receiving a message from a first device;
verifying that the message originated from inside the vehicle; and
providing the message to a second device.

2. The method of claim 1, wherein the message is directed to the second device.

3. The method of claim 2, further comprising accessing signal data in a signal data database to retrieve address information from the second device.

4. The method of claim 3, further comprising accessing signal data in a signal data database to retrieve address information for the first device.

5. The method of claim 4, further comprising comparing an address for the first device in the message with the retrieved address information.

6. The method of claim 5, wherein if the address for the first device in the message is the same as the retrieved address information, the message is verified.

7. The method of claim 6, wherein the message is sent through the vehicle communication system to the second device.

8. The method of claim 1, wherein verifying the message comprises:
determining signal characteristics;
determining location information;
determining person information;
determining movement information;
determining sensor information; and
resolving the signal characteristics, location information, person information, movement information, and sensor information to determine if the message originated inside the vehicle.

9. The method of claim 1, wherein the vehicle communication system includes at least one wireless LAN component.

10. The method of claim 9, wherein the first device communicates to the second device through the at least one wireless LAN component.

11. A vehicle communication system, comprising:
two or more BLUETOOTH transceivers;
a communication system comprising:
two or more communication modules;
a signal processor;
wherein the signal processor is operable to:
receive a message from a first device;
verify that the message originated from inside a vehicle; and
provide the message to a second device.

12. The vehicle communication system of claim 11, wherein the message is directed to the second device.

13. The vehicle communication system of claim 11, further comprising:
accessing signal data in a signal data database to retrieve address information from the second device, and
accessing signal data in a signal data database to retrieve address information for the first device.

14. The vehicle communication system of claim 11, further comprising comparing an address for the first device in the message with the retrieved address information, wherein if the address for the first device in the message is the same as the retrieved address information, the message is verified.

15. The vehicle communication system of claim 11, wherein the message is sent through the vehicle communication system to the second device.

16. A non-transitory computer readable medium having stored thereon computer-executable instructions, the computer executable instructions causing a processor to execute a method for providing a universal bus, the computer-executable instructions comprising:
instructions to receive a message from a first device;
instructions to verify that the message originated from inside a vehicle; and
instructions to provide the message to a second device.

17. The non-transitory computer readable medium of claim 16, wherein the vehicle communication system includes:
at least one wireless LAN component, and wherein at least one device connects through the at least one wireless LAN component;
two or more BLUETOOTH transceivers; and
a communication system comprising:
two or more communication modules; and
a signal processor.

18. The non-transitory computer readable medium of claim 17, wherein the communication system further comprises:
a signal data database; and
a translator.

19. The non-transitory computer readable medium of claim 18, further comprising:
instructions to access signal data in a signal data database to retrieve address information from the second device,
instructions to access signal data in a signal data database to retrieve address information for the first device; and
instructions to compare an address for the first device in the message with the retrieved address information, wherein if the address for the first device in the message is the same as the retrieved address information, the message is verified.

20. The non-transitory computer readable medium of claim 19, wherein the first device communicates to the second device through the at least one wireless LAN component.

* * * * *